United States Patent
Cui et al.

(10) Patent No.: US 10,211,966 B2
(45) Date of Patent: Feb. 19, 2019

(54) HALF-DUPLEX FREQUENCY DIVISION DUPLEX COMMUNICATION METHOD, BASE STATION, AND TERMINAL

(71) Applicant: Huawei Technologies Co., Ltd., Shenzhen (CN)

(72) Inventors: Jie Cui, Shenzhen (CN); Anjian Li, Beijing (CN); Jinhuan Xia, Beijing (CN); Xiaodong Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 151 days.

(21) Appl. No.: 15/192,672

(22) Filed: Jun. 24, 2016

(65) Prior Publication Data

US 2016/0308660 A1    Oct. 20, 2016

Related U.S. Application Data

(63) Continuation of application No. PCT/CN2014/073901, filed on Mar. 21, 2014.

(30) Foreign Application Priority Data

Dec. 25, 2013   (WO) .................. PCTCN2013090415

(51) Int. Cl.
  *H04L 5/14*   (2006.01)
  *H04L 5/00*   (2006.01)
  *H04L 5/16*   (2006.01)
(52) U.S. Cl.
  CPC .............. *H04L 5/143* (2013.01); *H04L 5/003* (2013.01); *H04L 5/16* (2013.01)
(58) Field of Classification Search
  CPC ............ H04L 5/003; H04L 5/143; H04L 5/16
  See application file for complete search history.

(56) References Cited

U.S. PATENT DOCUMENTS 8,964,609 B2 *   2/2015   Womack .............. H04B 7/2656
                                                       370/295
2002/0193108 A1   12/2002   Robinett
(Continued)

FOREIGN PATENT DOCUMENTS

CN    101584137 A    11/2009
CN    101682397 A     3/2010
(Continued)

OTHER PUBLICATIONS

"Half duplex FDD operation for Low complexity MTC UE," 3GPP TSG-RAN WG1 #74bis, Guangzhou, China, R1-134958, 3$^{rd}$ Generation Partnership Project, Valbonne, France (Oct. 7-11, 2013).
(Continued)

*Primary Examiner* — Edan Orgad
*Assistant Examiner* — Nourali Mansoury
(74) *Attorney, Agent, or Firm* — Leydig, Voit & Mayer, Ltd.

(57) ABSTRACT

When a terminal switches from a downlink subframe to an adjacent uplink subframe, generating a first guard period, where that the terminal does not process any signal in the first guard period is defined, that is, the terminal neither receives downlink data nor sends an uplink signal in the first guard period, and therefore uncertainty of a terminal behavior during a downlink-to-uplink switching process of the terminal is avoided, and successful sending of the uplink subframe can be ensured; and when the terminal switches from an uplink subframe to a downlink subframe, generating a second guard period, where the second guard period overlaps the uplink subframe or the downlink subframe, and that the terminal does not process any signal in the second guard period is defined, and therefore uncertainty of a terminal behavior during an uplink-to-downlink switching process of the terminal is avoided.

9 Claims, 11 Drawing Sheets

---

When data processing of a terminal switches from a downlink subframe to an adjacent uplink subframe, the terminal generates a first guard period, where the first guard period is greater than or equal to 1 millisecond — 101

The terminal skips processing any signal in the first guard period — 102

(56) References Cited

U.S. PATENT DOCUMENTS

| | | | |
|---|---|---|---|
| 2003/0224825 A1 | | 12/2003 | Cox et al. |
| 2007/0159972 A1* | | 7/2007 | Lanzinger .......... H04N 21/2402 370/230 |
| 2009/0122731 A1 | | 5/2009 | Montojo et al. |
| 2009/0196163 A1* | | 8/2009 | Du ....................... H04L 5/0046 370/204 |
| 2010/0085901 A1 | | 4/2010 | Womack et al. |
| 2010/0097963 A1 | | 4/2010 | Astely et al. |
| 2010/0214965 A1 | | 8/2010 | Kim et al. |
| 2010/0246456 A1* | | 9/2010 | Suo ....................... H04B 7/2656 370/280 |
| 2012/0063492 A1* | | 3/2012 | Palanki .............. H04B 7/15585 375/211 |
| 2013/0083710 A1 | | 4/2013 | Chen et al. |
| 2013/0136028 A1* | | 5/2013 | Gan ....................... H04W 24/02 370/252 |
| 2013/0250772 A1 | | 9/2013 | Yin |
| 2013/0301486 A1 | | 11/2013 | Kishiyama |
| 2013/0336302 A1* | | 12/2013 | Lee ......................... H04L 5/001 370/336 |
| 2014/0092880 A1* | | 4/2014 | Wang .................... H04L 5/0007 370/336 |
| 2014/0254415 A1* | | 9/2014 | Chen ..................... H04W 16/14 370/252 |
| 2015/0003303 A1 | | 1/2015 | Astely et al. |

FOREIGN PATENT DOCUMENTS

| | | |
|---|---|---|
| CN | 101754230 A | 6/2010 |
| CN | 101803262 A | 8/2010 |
| CN | 101841906 A | 9/2010 |
| CN | 101849398 A | 9/2010 |
| CN | 102137500 A | 7/2011 |
| CN | 102318234 A | 1/2012 |
| CN | 102804639 A | 11/2012 |
| CN | 103392368 A | 11/2013 |
| EP | 2360984 A1 | 8/2011 |
| RU | 2315427 C2 | 1/2008 |
| WO | WO 2008088252 A1 | 7/2008 |
| WO | 2013049746 A1 | 4/2013 |
| WO | WO 2015171032 A1 | 11/2015 |

OTHER PUBLICATIONS

"HD-RDD Switching Time for Low Cost MTC UE," 3GPP TSG-RAN WG4 Meeting #69, San Francisco, California, R4-136542, $3^{rd}$ Generation Partnership Project, Valbonne, France (Nov. 11-15, 2013).

"Way forward on LC-MTC half duplex guard period calculation," 3GPP TSG-RAN WG4 Meeting #69, San Francisco, California, R4-137120, PowerPoint presentation, $3^{rd}$ Generation Partnership Project, Valbonne, France (Nov. 11-15, 2013).

"$3^{rd}$ Generation Partnership Project; Technical Specification Group Radio Access Network; Evolved Universal Terrestrial Radio Access (E-UTRA); Physical channels and modulation (Release 12)," 3GPP TS 36.211, V12.0.0, pp. 1-120, $3^{rd}$ Generation Partnership Project, Valbonne, France (Dec. 2013).

"$3^{rd}$ Generation Partnership Project; Technical Specification Group Radio Access Network; Evolved Universal Terrestrial Radio Access (E-UTRA); Medium Access Control (MAC) protocol specification (Release 11)," 3GPP TS 36.321, V11.3.0, pp. 1-57, $3^{rd}$ Generation Partnership Project, Valbonne, France (Jun. 2013).

"Observations on HD-FDD Operation," 3GPP TSG-RAN WG1#51, Jeju, Korea, R1-074562, 3rd Generation Partnership Project, Valbonne, France (Nov. 5-9, 2007).

\* cited by examiner

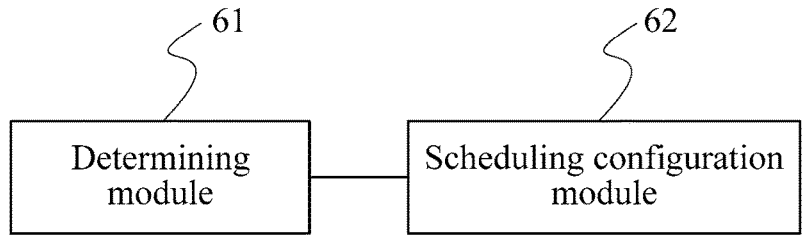
FIG. 6
When data processing of a terminal switches from a downlink subframe to an adjacent uplink subframe, the terminal generates a first guard period, where the first guard period is greater than or equal to 1 millisecond ～101
The terminal skips processing any signal in the first guard period ～102
FIG. 7
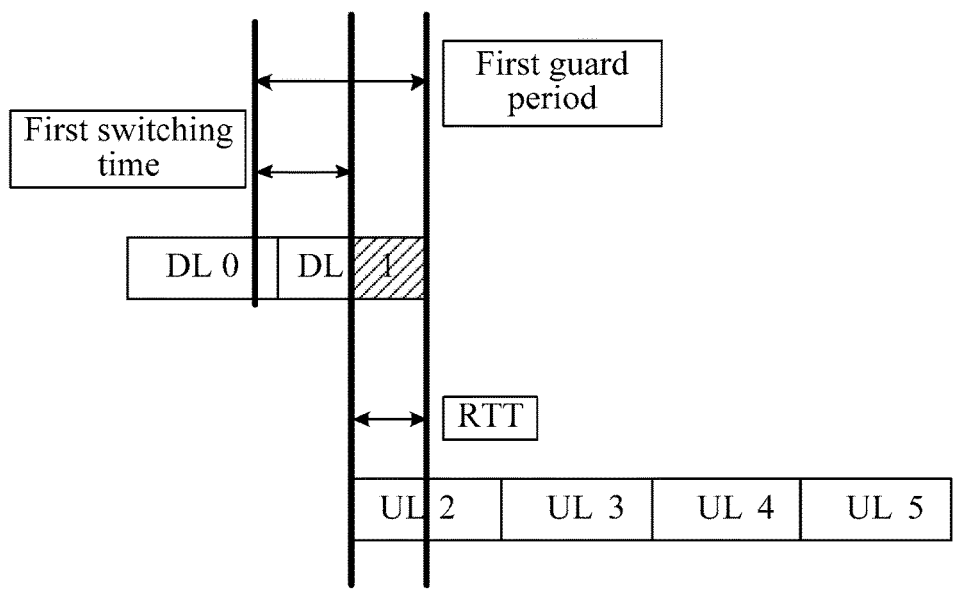
FIG. 8

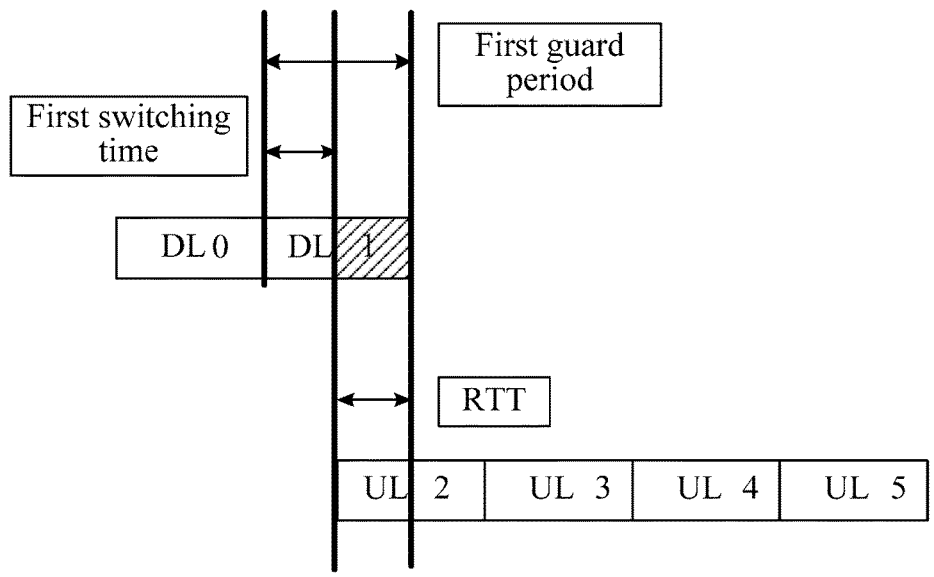

FIG. 9

When data processing of a terminal switches from a downlink subframe to an adjacent uplink subframe, a base station determines that a first guard period generated by the terminal overlaps the downlink subframe, where the first guard period is greater than or equal to 1 millisecond — 201

The base station skips scheduling the terminal in the downlink subframe, or sets a scheduling priority of the terminal in the downlink subframe to a lowest level — 202

FIG. 10

| When data processing of a terminal switches from a downlink subframe to an adjacent uplink subframe, the terminal generates a first guard period, where the first guard period is less than 1 millisecond, the first guard period overlaps a last part of the downlink subframe, and the terminal is not scheduled by a base station in a last timeslot of the downlink subframe | ~ 301 |

| The terminal skips receiving a downlink signal in the first guard period | ~ 302 |

FIG. 11

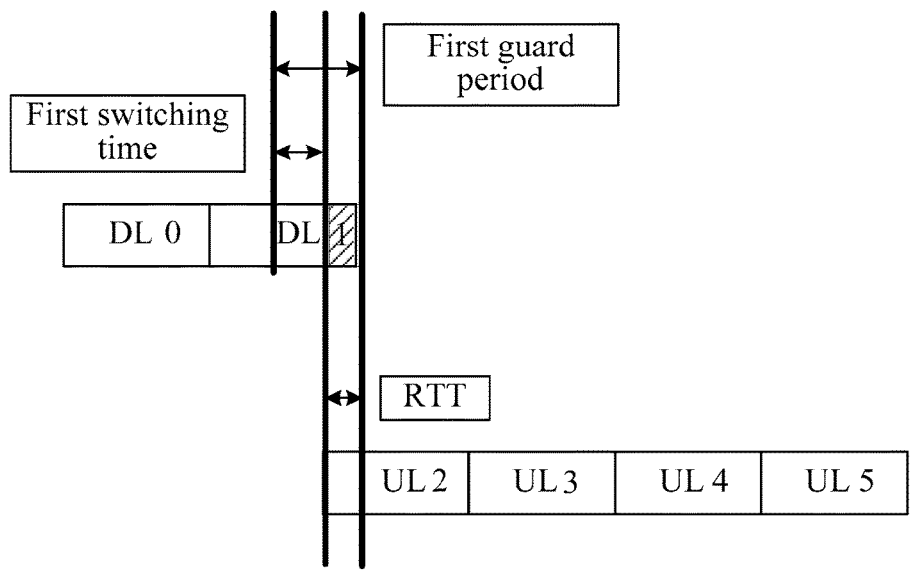

FIG. 12

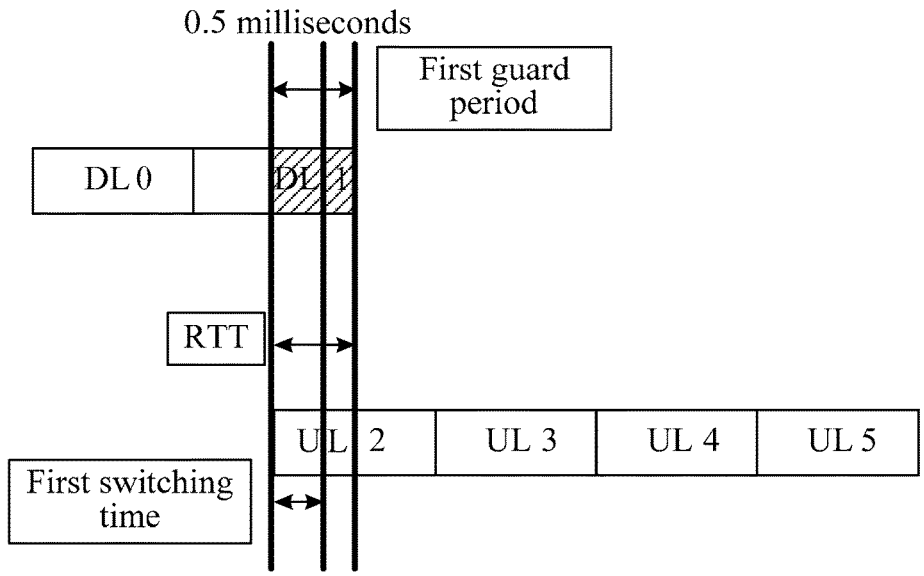

FIG. 13

When data processing of a terminal switches from a downlink subframe to an adjacent uplink subframe, a base station determines that a first guard period generated by the terminal overlaps a last timeslot of the downlink subframe, where the first guard period is less than 1 millisecond — 401

The base station skips scheduling the terminal in the last timeslot of the downlink subframe, or sets a scheduling priority of the terminal in the last timeslot of the downlink subframe to a lowest level — 402

FIG. 14

When data processing of a terminal switches from an uplink subframe to an adjacent downlink subframe, the terminal generates a second guard period — 501

The terminal skips processing any signal in the second guard period, or skips processing any signal in a subframe in which the second guard period is located — 502

FIG. 15

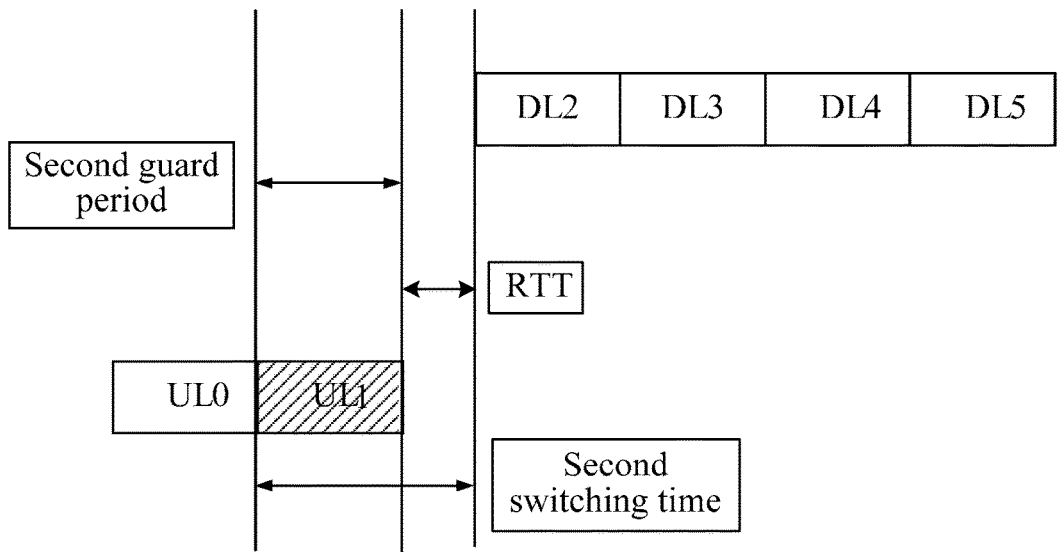

FIG. 20

When data processing of a terminal switches from an uplink subframe to an adjacent downlink subframe, a base station determines a second guard period generated by the terminal — 601

The base station skips scheduling the terminal in the second guard period or in a subframe in which the second guard period is located, or the base station sets a scheduling priority of the terminal in the second guard period or in a subframe in which the second guard period is located to a lowest level — 602

FIG. 21

HALF-DUPLEX FREQUENCY DIVISION DUPLEX COMMUNICATION METHOD, BASE STATION, AND TERMINAL

CROSS-REFERENCE

This application is a continuation of International Application No. PCT/CN2014/073901, filed on Mar. 21, 2014, which is hereby incorporated by reference in its entirety.

TECHNICAL FIELD

Embodiments of the present invention relate to communications technologies, and in particular, to a half-duplex frequency division duplex (FDD) communication method, a base station, and a terminal.

BACKGROUND

In a Long Term Evolution (LTE) system of the 3rd Generation Partnership Project (3GPP), for half-duplex FDD operations, during downlink-to-uplink switching, a terminal generates a guard period (GP), and in this guard period, the terminal does not receive data of a last part of a downlink subframe overlapping the guard period. However, neither a guard period nor a corresponding terminal behavior is defined for uplink-to-downlink switching.

To achieve low complexity or low costs of a half-duplex FDD terminal, when the half-duplex FDD terminal uses an oscillator to maintain a downlink receive frequency and an uplink transmit frequency, because an FDD system operates at different frequencies in the uplink and downlink, when the terminal switches from downlink to uplink, the oscillator needs to switch the frequency from a downlink frequency to an uplink frequency. When the terminal switches from uplink to downlink, the oscillator needs to switch the frequency from the uplink frequency to the downlink frequency.

However, when the oscillator switches a frequency channel number, an adjustment time is needed from a moment the oscillator performs the switching to a moment when the oscillator becomes stable, while the adjustment time leads to a change in a guard period for the uplink-to-downlink switching or downlink-to-uplink switching of the terminal, and if the guard period is not changed correspondingly, normal data transmission and receiving of the terminal are be affected. Therefore, new terminal behaviors need to be defined.

SUMMARY

Embodiments of the present invention provide a half-duplex frequency division duplex communication method, a base station, and a terminal, so as to ensure performance of a half-duplex FDD terminal and performance of a network side.

A first aspect of the present invention provides a terminal, including:

a generation module, configured to: when data processing of the terminal switches from a downlink subframe to an adjacent uplink subframe, generate a first guard period, where the first guard period is greater than or equal to 1 millisecond; and a processing module, configured to skip processing any signal in the first guard period.

In a first possible implementation manner of the first aspect of the present invention, when the first guard period is greater than 1 millisecond, the first guard period overlaps the downlink subframe and a last part of a first downlink subframe immediately preceding the downlink subframe; and the processing module is specifically configured to: skip receiving a downlink signal in the downlink subframe and the last part of the first downlink subframe.

In a second possible implementation manner of the first aspect of the present invention, when the first guard period is greater than 1 millisecond, the first guard period overlaps the downlink subframe and a last part of an uplink subframe immediately preceding the downlink subframe; and the processing module is specifically configured to: skip receiving a downlink signal in the downlink subframe, and skip sending an uplink signal in the last part of the uplink subframe immediately preceding the downlink subframe.

In a third possible implementation manner of the first aspect of the present invention, when the first guard period is equal to 1 millisecond, the first guard period overlaps the downlink subframe, and the processing module is specifically configured to:

skip receiving a downlink signal in the downlink subframe.

With reference to the first aspect of the present invention and the first to third possible implementation manners of the first aspect, in a fourth possible implementation manner of the first aspect of the present invention, the generation module is specifically configured to:

generate the first guard period according to a round trip time and a first switching time, where the first switching time includes: a frequency adjustment time and a power adjustment time, the frequency adjustment time is an adjustment time for switching from a downlink frequency to an uplink frequency by an oscillator of the terminal, and the power adjustment time is an adjustment time for adjusting a power from 0 to an uplink transmit power by the terminal.

In a fifth possible implementation manner of the first aspect of the present invention, the first guard period is less than or equal to a sum of the round trip time and the first switching time.

In a sixth possible implementation manner of the first aspect of the present invention, the generation module is specifically configured to add the round trip time and the first switching time, to obtain the first guard period.

With reference to the first aspect of the present invention and the first to sixth possible implementation manners of the first aspect, in a seventh possible implementation manner of the first aspect of the present invention, the terminal is not scheduled by the base station in the downlink subframe.

A second aspect of the present invention provides a base station, including:

a determining module, configured to: when data processing of a terminal switches from a downlink subframe to an adjacent uplink subframe, determine that a first guard period generated by the terminal overlaps the downlink subframe, where the first guard period is greater than or equal to 1 millisecond; and a scheduling configuration module, configured to configure the base station to skip scheduling the terminal in the downlink subframe, or set a scheduling priority of the terminal in the downlink subframe to a lowest level.

In a first possible implementation manner of the second aspect of the present invention, the determining module is specifically configured to:

determine whether the first guard period generated by the terminal is greater than or equal to 1 millisecond; and if yes, determine that the first guard period overlaps the downlink subframe.

In a second possible implementation manner of the second aspect of the present invention, when the first guard period is greater than 1 millisecond, the first guard period overlaps the downlink subframe and a last part of a first downlink subframe immediately preceding the downlink subframe.

In a third possible implementation manner of the second aspect of the present invention, when the first guard period is greater than 1 millisecond, the first guard period overlaps the downlink subframe and a last part of an uplink subframe immediately preceding the downlink subframe.

In a fourth possible implementation manner of the second aspect of the present invention, when the first guard period is equal to 1 millisecond, the first guard period overlaps the downlink subframe.

A third aspect of the present invention provides a terminal, including:

a generation module, configured to: when data processing of the terminal switches from a downlink subframe to an adjacent uplink subframe, generate a first guard period, where the first guard period is less than 1 millisecond, the first guard period overlaps a last part of the downlink subframe, and the terminal is not scheduled by a base station in a last timeslot of the downlink subframe; and a processing module, configured to skip receiving a downlink signal in the first guard period.

In a first possible implementation manner of the third aspect of the present invention, the generation module is specifically configured to:

generate the first guard period according to a round trip time and a first switching time, where the first switching time includes: a frequency adjustment time and a power adjustment time, the frequency adjustment time is an adjustment time for switching from a downlink frequency to an uplink frequency by an oscillator of the terminal, and the power adjustment time is an adjustment time for adjusting a power from 0 to an uplink transmit power by the terminal.

In a second possible implementation manner of the third aspect of the present invention, the generation module is specifically configured to:

if the first switching time is included in the round trip time, use the round trip time or the first switching time as the first guard period; or if the first switching time does not overlap the round trip time, add the round trip time and the first switching time, to obtain the first guard period.

A fourth aspect of the present invention provides a base station, including:

a determining module, configured to: when data processing of a terminal switches from a downlink subframe to an adjacent uplink subframe, determine that a first guard period generated by the terminal overlaps a last timeslot of the downlink subframe, where the first guard period is less than 1 millisecond; and a scheduling configuration module, configured to configure the base station to skip scheduling the terminal in the last timeslot of the downlink subframe, or set a scheduling priority of the terminal in the last timeslot of the downlink subframe to a lowest level.

In a first possible implementation manner of the fourth aspect of the present invention, the determining module is specifically configured to:

determine whether the first guard period generated by the terminal is greater than or equal to 0.5 milliseconds and less than 1 millisecond; and if yes, determine that the first guard period overlaps the last timeslot of the downlink subframe.

A fifth aspect of the present invention provides a terminal, including:

a generation module, configured to: when data processing of the terminal switches from an uplink subframe to an adjacent downlink subframe, generate a second guard period; and a processing module, configured to skip processing any signal in the second guard period, or configured to skip processing any signal in a subframe in which the second guard period is located.

In a first possible implementation manner of the fifth aspect of the present invention, the generation module is specifically configured to:

when data processing of the terminal switches from an uplink subframe to an adjacent downlink subframe, determine whether the downlink subframe includes physical hybrid automatic repeat request indicator channel PHICH information sent to the terminal;

if the downlink subframe includes the PHICH information sent to the terminal, generate the second guard period, where the second guard period overlaps the uplink subframe; or if the downlink subframe does not include the PHICH information sent to the terminal, generate the second guard period, where the second guard period overlaps the downlink subframe.

In a second possible implementation manner of the fifth aspect of the present invention, the generation module is specifically configured to:

when data processing of the terminal switches from an uplink subframe to an adjacent downlink subframe, determine whether the uplink subframe includes any one of the following uplink signals: a sounding reference signal SRS, a channel quality indicator CQI, and physical uplink control channel PUCCH information;

if the uplink subframe includes any one of the uplink signals, generate the second guard period, where the second guard period overlaps the downlink subframe; or if the uplink subframe does not include any one of the uplink signals, generate the second guard period, where the second guard period overlaps the uplink subframe.

With reference to the fifth aspect of the present invention and the first and second possible implementation manners of the fifth aspect, in a third possible implementation manner of the fifth aspect of the present invention, the second guard period is less than 1 millisecond, the second guard period overlaps a first part of the downlink subframe, where the first part of the downlink subframe is an overlapping part between the second guard period and the downlink subframe, and the processing module is specifically configured to:

skip receiving a downlink signal in the first part of the downlink subframe, or skip receiving a downlink signal in the downlink subframe.

With reference to the fifth aspect of the present invention and the first and second possible implementation manners of the fifth aspect, in a fourth possible implementation manner of the fifth aspect of the present invention, the second guard period is less than 1 millisecond, the second guard period overlaps a last part of the uplink subframe, where the last part of the uplink subframe is an overlapping part between the second guard period and the uplink subframe, and the processing module is specifically configured to:

skip sending an uplink signal in the last part of the uplink subframe, or skip sending an uplink signal in the uplink subframe.

With reference to the fifth aspect of the present invention and the first and second possible implementation manners of the fifth aspect, in a fifth possible implementation manner of the fifth aspect of the present invention, the second guard period is equal to 1 millisecond, the second guard period overlaps the downlink subframe, and the processing module is specifically configured to:

skip receiving a downlink signal in the downlink subframe.

With reference to the fifth aspect of the present invention and the first and second possible implementation manners of the fifth aspect, in a sixth possible implementation manner of the fifth aspect of the present invention, the second guard period is equal to 1 millisecond, the second guard period overlaps the uplink subframe, and the processing module is specifically configured to:

skip sending an uplink signal in the uplink subframe.

With reference to the fifth aspect of the present invention and the first to sixth possible implementation manners of the fifth aspect, in a seventh possible implementation manner of the fifth aspect of the present invention, the terminal is not scheduled by a base station in the second guard period, or the terminal is not scheduled by a base station in a subframe in which the second guard period is located.

With reference to the third or fifth possible implementation manner of the fifth aspect of the present invention, in an eighth possible implementation manner of the fifth aspect of the present invention, the downlink signal includes any one or more of: a physical downlink control channel PDCCH signal, an enhanced physical downlink control channel EPDCCH signal, a cell-specific reference signal, a multimedia broadcast multicast service single frequency network MBSFN signal, a service data signal, a physical hybrid automatic repeat request indicator channel PHICH signal, and a physical control format indicator channel PCFICH signal.

In a ninth possible implementation manner of the fifth aspect of the present invention, when the second guard period overlaps the first part of the downlink subframe, if the terminal is configured by the base station to receive an enhanced physical downlink control channel EPDCCH signal in the downlink subframe, the processing module is specifically configured to:

skip receiving the EPDCCH signal or the downlink signal in the first part of the downlink subframe.

In a tenth possible implementation manner of the fifth aspect of the present invention, when the second guard period overlaps the first part of the downlink subframe, if the terminal is configured by the base station to receive an enhanced physical downlink control channel EPDCCH signal in the downlink subframe, the processing module is specifically configured to:

determine whether the second guard period overlaps a receiving time of the EPDCCH signal;

if the second guard period overlaps the receiving time of the EPDCCH signal, skip receiving the EPDCCH signal or the downlink signal in the downlink subframe; or if the second guard period does not overlap the receiving time of the EPDCCH signal, skip receiving the EPDCCH signal or the downlink signal in the first part of the downlink subframe.

In an eleventh possible implementation manner of the fifth aspect of the present invention, when the second guard period overlaps the first part of the downlink subframe, if the terminal is configured by the base station to receive a multimedia broadcast multicast service single frequency network MBSFN signal in the downlink subframe, the processing module is specifically configured to:

skip receiving the MBSFN signal or the downlink signal in the first part of the downlink subframe.

In a twelfth possible implementation manner of the fifth aspect of the present invention, when the second guard period overlaps the first part of the downlink subframe, if the terminal is configured by the base station to receive a multimedia broadcast multicast service single frequency network MBSFN signal in the downlink subframe, the processing module is specifically configured to:

determine whether the second guard period overlaps a receiving time of the MB SFN signal;

if the second guard period overlaps the receiving time of the MB SFN signal, skip receiving the MBSFN signal or the downlink signal in the downlink subframe; or if the second guard period does not overlap the receiving time of the MBSFN signal, skip receiving the MBSFN signal or the downlink signal in the first part of the downlink subframe.

In a thirteenth possible implementation manner of the fifth aspect of the present invention, when the second guard period overlaps the first part of the downlink subframe, if the terminal is configured by the base station to receive a physical downlink shared channel PDSCH signal in the downlink subframe, the processing module is specifically configured to:

determine whether a physical downlink control channel PDCCH signal corresponding to the PDSCH signal is included in the downlink subframe;

if the PDCCH signal is included in the downlink subframe, skip receiving the PDSCH signal or the downlink signal in the downlink subframe; or if the PDCCH signal is not included in the downlink subframe, skip receiving the PDSCH signal or the downlink signal in the first part of the downlink subframe.

With reference to the third or fifth possible implementation manner of the fifth aspect of the present invention, in a fourteenth possible implementation manner of the fifth aspect of the present invention, when the terminal skips receiving a downlink signal in the first part of the downlink subframe, or skips receiving a downlink signal in the downlink subframe, if the downlink subframe includes the PHICH information sent to the terminal, the terminal receives, in the Nth downlink subframe after the downlink subframe, the PHICH information sent to the terminal, where N is a positive integer greater than or equal to 1.

With reference to the fifth aspect of the present invention and the first to fourteenth possible implementation manners of the fifth aspect, in a fifteenth possible implementation manner of the fifth aspect of the present invention, the generation module is specifically configured to:

generate the second guard period according to a round trip time and a second switching time, where the second switching time includes: a frequency adjustment time and a power adjustment time, the frequency adjustment time is an adjustment time for switching from an uplink frequency to a downlink frequency by an oscillator of the terminal, and the power adjustment time is an adjustment time for adjusting a downlink power of the terminal from 0 to a transmit power.

In a sixteenth possible implementation manner of the fifth aspect of the present invention, if the second switching time is greater than the round trip time, the generation module is specifically configured to:

subtract the round trip time from the second switching time, to obtain the second guard period.

A sixth aspect of the present invention provides a base station, including:

a determining module, configured to: when data processing of a terminal switches from an uplink subframe to an adjacent downlink subframe, determine a second guard period generated by the terminal; and a scheduling configuration module, configured to configure the base station to skip scheduling the terminal in the second guard period or in a subframe in which the second guard period is located, or set a scheduling priority of the terminal in the second guard period or in a subframe in which the second guard period is located to a lowest level.

In a first possible implementation manner of the sixth aspect of the present invention, the determining module is specifically configured to:

when data processing of the terminal switches from an uplink subframe to an adjacent downlink subframe, determine whether the downlink subframe includes physical hybrid automatic repeat request indicator channel PHICH information sent to the terminal;

if the downlink subframe includes the PHICH information sent to the terminal, determine that the second guard period overlaps the uplink subframe; or if the downlink subframe does not include the PHICH information sent to the terminal, determine that the second guard period overlaps the downlink subframe; and the scheduling configuration module is specifically configured to:

if the second guard period overlaps the uplink subframe, configure the base station to skip scheduling the terminal in a last part of the uplink subframe or in the uplink subframe, or set a scheduling priority of the terminal in a last part of the uplink subframe or in the uplink subframe to a lowest level, where the last part of the uplink subframe is an overlapping part between the second guard period and the uplink subframe; or if the second guard period overlaps the downlink subframe, configure the base station to skip scheduling the terminal in a first part of the downlink subframe or in the downlink subframe, or set a scheduling priority of the terminal in a first part of the downlink subframe or in the downlink subframe to a lowest level, where the first part of the downlink subframe is an overlapping part between the second guard period and the downlink subframe.

In a second possible implementation manner of the sixth aspect of the present invention, the determining module is specifically configured to:

when data processing of the terminal switches from an uplink subframe to an adjacent downlink subframe, determine whether the uplink subframe includes any one of the following uplink signals: a sounding reference signal SRS, a channel quality indicator CQI, and physical uplink control channel PUCCH information;

if the uplink subframe includes any one of the uplink signals, determine that the second guard period overlaps the downlink subframe; or if the uplink subframe does not include any one of the uplink signals, determine that the second guard period overlaps the uplink subframe; and the scheduling configuration module is specifically configured to:

if the second guard period overlaps the uplink subframe, configure the base station to skip scheduling the terminal in a last part of the uplink subframe or in the uplink subframe, or set a scheduling priority of the terminal in a last part of the uplink subframe or in the uplink subframe to a lowest level, where the last part of the uplink subframe is an overlapping part between the second guard period and the uplink subframe; or if the second guard period overlaps the downlink subframe, configure the base station to skip scheduling the terminal in a first part of the downlink subframe or in the downlink subframe, or set a scheduling priority of the terminal in a first part of the downlink subframe or in the downlink subframe to a lowest level, where the first part of the downlink subframe is an overlapping part between the second guard period and the downlink subframe.

In a third possible implementation manner of the sixth aspect of the present invention, when the base station skips scheduling the terminal in the first part of the downlink subframe or in the downlink subframe, or sets the scheduling priority of the terminal in the first part of the downlink subframe or in the downlink subframe to the lowest level, if the downlink subframe includes the PHICH information sent to the terminal, the base station sends, in the Nth downlink subframe after the downlink subframe, the PHICH information to the terminal, where N is a positive integer greater than or equal to 1.

A seventh aspect of the present invention provides a half-duplex frequency division duplex communication method, including:

when data processing of a terminal switches from a downlink subframe to an adjacent uplink subframe, generating, by the terminal, a first guard period, where the first guard period is greater than or equal to 1 millisecond; and skipping, by the terminal, processing any signal in the first guard period.

In a first possible implementation manner of the seventh aspect of the present invention, when the first guard period is greater than 1 millisecond, the first guard period overlaps the downlink subframe and a last part of a first downlink subframe immediately preceding the downlink subframe, and the skipping, by the terminal, processing any signal in the first guard period includes:

skipping, by the terminal, receiving a downlink signal in the downlink subframe and the last part of the first downlink subframe.

In a second possible implementation manner of the seventh aspect of the present invention, when the first guard period is greater than 1 millisecond, the first guard period overlaps the downlink subframe and a last part of an uplink subframe immediately preceding the downlink subframe, and the skipping, by the terminal, processing any signal in the first guard period includes:

skipping, by the terminal, receiving a downlink signal in the downlink subframe, and skipping sending an uplink signal in the last part of the uplink subframe immediately preceding the downlink subframe.

In a third possible implementation manner of the seventh aspect of the present invention, when the first guard period is equal to 1 millisecond, the first guard period overlaps the downlink subframe, and the skipping, by the terminal, processing any signal in the first guard period includes:

skipping, by the terminal, receiving a downlink signal in the downlink subframe.

With reference to the seventh aspect of the present invention and the first to third possible implementation manners of the seventh aspect, in a fourth possible implementation manner of the seventh aspect of the present invention, the generating, by the terminal, a first guard period includes:

generating, by the terminal, the first guard period according to a round trip time and a first switching time, where the first switching time includes: a frequency adjustment time and a power adjustment time, the frequency adjustment time is an adjustment time for switching from a downlink frequency to an uplink frequency by an oscillator of the terminal, and the power adjustment time is an adjustment time for adjusting a power from 0 to an uplink transmit power by the terminal.

In a fifth possible implementation manner of the seventh aspect of the present invention, the first guard period is less than or equal to a sum of the round trip time and the first switching time.

In a sixth possible implementation manner of the seventh aspect of the present invention, the generating, by the terminal, the first guard period according to a round trip time and a first switching time includes:

adding, by the terminal, the round trip time and the first switching time, to obtain the first guard period.

With reference to the seventh aspect of the present invention and the first to sixth possible implementation manners of the seventh aspect, in a seventh possible implementation manner of the seventh aspect of the present invention, the terminal is not scheduled by the base station in the downlink subframe.

An eighth aspect of the present invention provides a half-duplex frequency division duplex communication method, including:

when data processing of a terminal switches from a downlink subframe to an adjacent uplink subframe, determining, by a base station, that a first guard period generated by the terminal overlaps the downlink subframe, where the first guard period is greater than or equal to 1 millisecond; and skipping, by the base station, scheduling the terminal in the downlink subframe, or setting a scheduling priority of the terminal in the downlink subframe to a lowest level.

In a first possible implementation manner of the eighth aspect of the present invention, the determining, by a base station, that a first guard period generated by the terminal overlaps the downlink subframe includes:

determining, by the base station, whether the first guard period generated by the terminal is greater than or equal to 1 millisecond; and if yes, determining, by the base station, that the first guard period overlaps the downlink subframe.

In a second possible implementation manner of the eighth aspect of the present invention, when the first guard period is greater than 1 millisecond, the first guard period overlaps the downlink subframe and a last part of a first downlink subframe immediately preceding the downlink subframe.

In a third possible implementation manner of the eighth aspect of the present invention, when the first guard period is greater than 1 millisecond, the first guard period overlaps the downlink subframe and a last part of an uplink subframe immediately preceding the downlink subframe.

In a fourth possible implementation manner of the eighth aspect of the present invention, when the first guard period is equal to 1 millisecond, the first guard period overlaps the downlink subframe.

A ninth aspect of the present invention provides a half-duplex frequency division duplex communication method, including:

when data processing of a terminal switches from a downlink subframe to an adjacent uplink subframe, generating, by the terminal, a first guard period, where the first guard period is less than 1 millisecond, the first guard period overlaps a last part of the downlink subframe, and the terminal is not scheduled by a base station in a last timeslot of the downlink subframe; and skipping, by the terminal, receiving a downlink signal in the first guard period.

In a first possible implementation manner of the ninth aspect of the present invention, the generating, by the terminal, a first guard period includes:

generating, by the terminal, the first guard period according to a round trip time and a first switching time, where the first switching time includes: a frequency adjustment time and a power adjustment time, the frequency adjustment time is an adjustment time for switching from a downlink frequency to an uplink frequency by an oscillator of the terminal, and the power adjustment time is an adjustment time for adjusting a power from 0 to an uplink transmit power by the terminal.

In a second possible implementation manner of the ninth aspect of the present invention, the generating, by the terminal, the first guard period according to a round trip time and a first switching time includes:

if the first switching time is included in the round trip time, using, by the terminal, the round trip time or the first switching time as the first guard period; or if the first switching time does not overlap the round trip time, adding, by the terminal, the round trip time and the first switching time, to obtain the first guard period.

A tenth aspect of the present invention provides a half-duplex frequency division duplex communication method, including:

when data processing of a terminal switches from a downlink subframe to an adjacent uplink subframe, determining, by a base station, that a first guard period generated by the terminal overlaps a last timeslot of the downlink subframe, where the first guard period is less than 1 millisecond; and skipping, by the base station, scheduling the terminal in the last timeslot of the downlink subframe, or setting a scheduling priority of the terminal in the last timeslot of the downlink subframe to a lowest level.

In a first possible implementation manner of the tenth aspect of the present invention, the determining, by a base station, that a first guard period generated by the terminal overlaps a last timeslot of the downlink subframe includes:

determining, by the base station, whether the first guard period generated by the terminal is greater than or equal to 0.5 milliseconds and less than 1 millisecond; and if yes, determining, by the base station, that the first guard period overlaps the last timeslot of the downlink subframe.

An eleventh aspect of the present invention provides a half-duplex frequency division duplex communication method, including:

when data processing of a terminal switches from an uplink subframe to an adjacent downlink subframe, generating, by the terminal, a second guard period; and skipping, by the terminal, processing any signal in the second guard period, or skipping, by the terminal, processing any signal in a subframe in which the second guard period is located.

In a first possible implementation manner of the eleventh aspect of the present invention, the generating, by the terminal, a second guard period includes:

determining, by the terminal, whether the downlink subframe includes physical hybrid automatic repeat request indicator channel PHICH information sent to the terminal;

if the downlink subframe includes the PHICH information sent to the terminal, generating, by the terminal, the second guard period, where the second guard period overlaps the uplink subframe; or if the downlink subframe does not include the PHICH information sent to the terminal, generating, by the terminal, the second guard period, where the second guard period overlaps the downlink subframe.

In a second possible implementation manner of the eleventh aspect of the present invention, the generating, by the terminal, a second guard period includes:

determining, by the terminal, whether the uplink subframe includes any one of the following uplink signals: a sounding reference signal SRS, a channel quality indicator CQI, and physical uplink control channel PUCCH information;

if the uplink subframe includes any one of the uplink signals, generating, by the terminal, the second guard period, where the second guard period overlaps the downlink subframe; or if the uplink subframe does not include any one of the uplink signals, generating, by the terminal, the second guard period, where the second guard period overlaps the uplink subframe.

With reference to the eleventh aspect of the present invention and the first and second possible implementation manners of the eleventh aspect, in a third possible implementation manner of the eleventh aspect of the present invention, the second guard period is less than 1 millisecond, the second guard period overlaps a first part of the downlink subframe, where the first part of the downlink subframe is an overlapping part between the second guard period and the downlink subframe, and the skipping, by the terminal, processing any signal in the second guard period includes:

skipping, by the terminal, receiving a downlink signal in the first part of the downlink subframe; and the skipping, by the terminal, processing any signal in a subframe in which the second guard period is located includes:

skipping, by the terminal, receiving a downlink signal in the downlink subframe.

With reference to the eleventh aspect of the present invention and the first and second possible implementation manners of the eleventh aspect, in a fourth possible implementation manner of the eleventh aspect of the present invention, the second guard period is less than 1 millisecond, the second guard period overlaps a last part of the uplink subframe, where the last part of the uplink subframe is an overlapping part between the second guard period and the uplink subframe, and the skipping, by the terminal, processing any signal in the second guard period includes:

skipping, by the terminal, sending an uplink signal in the last part of the uplink subframe; and the skipping, by the terminal, processing any signal in a subframe in which the second guard period is located includes:

skipping, by the terminal, sending an uplink signal in the uplink subframe.

With reference to the eleventh aspect of the present invention and the first and second possible implementation manners of the eleventh aspect, in a fifth possible implementation manner of the eleventh aspect of the present invention, the second guard period is equal to 1 millisecond, and the second guard period overlaps the downlink subframe;

the skipping, by the terminal, processing any signal in the second guard period includes:

skipping, by the terminal, receiving a downlink signal in the downlink subframe; and the skipping, by the terminal, processing any signal in a subframe in which the second guard period is located includes:

skipping, by the terminal, receiving a downlink signal in the downlink subframe.

With reference to the eleventh aspect of the present invention and the first and second possible implementation manners of the eleventh aspect, in a sixth possible implementation manner of the eleventh aspect of the present invention, the second guard period is equal to 1 millisecond, and the second guard period overlaps the uplink subframe;

the skipping, by the terminal, processing any signal in the second guard period includes:

skipping, by the terminal, sending an uplink signal in the uplink subframe; and the skipping, by the terminal, processing any signal in a subframe in which the second guard period is located includes:

skipping, by the terminal, sending an uplink signal in the uplink subframe.

With reference to the eleventh aspect of the present invention and the first to sixth possible implementation manners of the eleventh aspect, in a seventh possible implementation manner of the eleventh aspect of the present invention, the terminal is not scheduled by a base station in the second guard period, or the terminal is not scheduled by a base station in a subframe in which the second guard period is located.

With reference to the third or fifth possible implementation manner of the eleventh aspect of the present invention, in an eighth possible implementation manner of the eleventh aspect of the present invention, the downlink signal includes any one or more of: a physical downlink control channel PDCCH signal, an enhanced physical downlink control channel EPDCCH signal, a cell-specific reference signal, a multimedia broadcast multicast service single frequency network MBSFN signal, a service data signal, a physical hybrid automatic repeat request indicator channel PHICH signal, and a physical control format indicator channel PCFICH signal.

In a ninth possible implementation manner of the eleventh aspect of the present invention, when the second guard period overlaps the first part of the downlink subframe, if the terminal is configured by the base station to receive an enhanced physical downlink control channel EPDCCH signal in the downlink subframe, the skipping, by the terminal, receiving a downlink signal in the first part of the downlink subframe includes:

skipping, by the terminal, receiving the EPDCCH signal or the downlink signal in the first part of the downlink subframe.

In a tenth possible implementation manner of the eleventh aspect of the present invention, when the second guard period overlaps the first part of the downlink subframe, if the terminal is configured by the base station to receive an enhanced physical downlink control channel EPDCCH signal in the downlink subframe, the skipping, by the terminal, receiving a downlink signal in the first part of the downlink subframe includes:

determining, by the terminal, whether the second guard period overlaps a receiving time of the EPDCCH signal;

if the second guard period overlaps the receiving time of the EPDCCH signal, skipping, by the terminal, receiving the EPDCCH signal or the downlink signal in the downlink subframe; or if the second guard period does not overlap the receiving time of the EPDCCH signal, skipping, by the terminal, receiving the EPDCCH signal or the downlink signal in the first part of the downlink subframe.

In an eleventh possible implementation manner of the eleventh aspect of the present invention, when the second guard period overlaps the first part of the downlink subframe, if the terminal is configured by the base station to receive a multimedia broadcast multicast service single frequency network MB SFN signal in the downlink subframe, the skipping, by the terminal, receiving a downlink signal in the first part of the downlink subframe includes:

skipping, by the terminal, receiving the MBSFN signal or the downlink signal in the first part of the downlink subframe.

In a twelfth possible implementation manner of the eleventh aspect of the present invention, when the second guard period overlaps the first part of the downlink subframe, if the terminal is configured by the base station to receive a multimedia broadcast multicast service single frequency network MB SFN signal in the downlink subframe, the skipping, by the terminal, receiving a downlink signal in the first part of the downlink subframe includes:

determining, by the terminal, whether the second guard period overlaps a receiving time of the MBSFN signal;

if the second guard period overlaps the receiving time of the MBSFN signal, skipping, by the terminal, receiving the MBSFN signal or the downlink signal in the downlink subframe; or if the second guard period does not overlap the receiving time of the MBSFN signal, skipping, by the terminal, receiving the MBSFN signal or the downlink signal in the first part of the downlink subframe.

In a thirteenth possible implementation manner of the eleventh aspect of the present invention, when the second guard period overlaps the first part of the downlink subframe, if the terminal is configured by the base station to receive a physical downlink shared channel PDSCH signal in the downlink subframe, the skipping, by the terminal, receiving a downlink signal in the first part of the downlink subframe includes:

determining, by the terminal, whether a physical downlink control channel PDCCH signal corresponding to the PDSCH signal is included in the downlink subframe;

if the PDCCH signal is included in the downlink subframe, skipping, by the terminal, receiving the PDSCH signal or the downlink signal in the downlink subframe; or if the PDCCH signal is not included in the downlink subframe, skipping, by the terminal, receiving the PDSCH signal or the downlink signal in the first part of the downlink subframe.

With reference to the third or fifth possible implementation manner of the eleventh aspect of the present invention, in a fourteenth possible implementation manner of the eleventh aspect of the present invention, when the terminal skips receiving a downlink signal in the first part of the downlink subframe, or skips receiving a downlink signal in the downlink subframe, if the downlink subframe includes the PHICH information sent to the terminal, the terminal receives, in the Nth downlink subframe after the downlink subframe, the PHICH information sent to the terminal, where N is a positive integer greater than or equal to 1.

With reference to the eleventh aspect of the present invention and the first to fourteenth possible implementation manners of the eleventh aspect, in a fifteenth possible implementation manner of the eleventh aspect of the present invention, the generating, by the terminal, a second guard period includes:

generating, by the terminal, the second guard period according to a round trip time and a second switching time, where the second switching time includes: a frequency adjustment time and a power adjustment time, the frequency adjustment time is an adjustment time for switching from an uplink frequency to a downlink frequency by an oscillator of the terminal, and the power adjustment time is an adjustment time for adjusting a downlink power of the terminal from 0 to a transmit power.

In a sixteenth possible implementation manner of the eleventh aspect of the present invention, if the second switching time is greater than the round trip time, the generating, by the terminal, the second guard period according to a round trip time and a second switching time includes:

subtracting, by the terminal, the round trip time from the second switching time, to obtain the second guard period.

A twelfth aspect of the present invention provides a half-duplex frequency division duplex communication method, including:

when data processing of a terminal switches from an uplink subframe to an adjacent downlink subframe, determining, by a base station, a second guard period generated by the terminal; and skipping, by the base station, scheduling the terminal in the second guard period or in a subframe in which the second guard period is located, or setting, by the base station, a scheduling priority of the terminal in the second guard period or in a subframe in which the second guard period is located to a lowest level.

In a first possible implementation manner of the twelfth aspect of the present invention, the determining, by a base station, a second guard period generated by the terminal includes:

determining, by the base station, whether the downlink subframe includes physical hybrid automatic repeat request indicator channel PHICH information sent to the terminal;

if the downlink subframe includes the PHICH information sent to the terminal, determining, by the base station, that the second guard period overlaps the uplink subframe; or if the downlink subframe does not include the PHICH information sent to the terminal, determining, by the base station, that the second guard period overlaps the downlink subframe; and the skipping, by the base station, scheduling the terminal in the second guard period or in a subframe in which the second guard period is located, or setting, by the base station, a scheduling priority of the terminal in the second guard period or in a subframe in which the second guard period is located to a lowest level includes:

if the second guard period overlaps the uplink subframe, skipping, by the base station, scheduling the terminal in a last part of the uplink subframe or in the uplink subframe, or setting a scheduling priority of the terminal in a last part of the uplink subframe or in the uplink subframe to a lowest level, where the last part of the uplink subframe is an overlapping part between the second guard period and the uplink subframe; or if the second guard period overlaps the downlink subframe, skipping, by the base station, scheduling the terminal in a first part of the downlink subframe or in the downlink subframe, or setting a scheduling priority of the terminal in a first part of the downlink subframe or in the downlink subframe to a lowest level, where the first part of the downlink subframe is an overlapping part between the second guard period and the downlink subframe.

In a second possible implementation manner of the twelfth aspect of the present invention, the determining, by a base station, a second guard period generated by the terminal includes:

determining, by the base station, whether the uplink subframe includes any one of the following uplink signals: a sounding reference signal SRS, a channel quality indicator CQI, and physical uplink control channel PUCCH information;

if the uplink subframe includes any one of the uplink signals, determining, by the base station, that the second guard period overlaps the downlink subframe; or if the uplink subframe does not include any one of the uplink signals, determining, by the base station, that the second guard period overlaps the uplink subframe; and the skipping, by the base station, scheduling the terminal in the second guard period or in a subframe in which the second guard period is located, or setting, by the base station, a scheduling priority of the terminal in the second guard period or in a subframe in which the second guard period is located to a lowest level includes:

if the second guard period overlaps the uplink subframe, skipping, by the base station, scheduling the terminal in a last part of the uplink subframe or in the uplink subframe, or setting a scheduling priority of the terminal in a last part of the uplink subframe or in the uplink subframe to a lowest level, where the last part of the uplink subframe is an overlapping part between the second guard period and the uplink subframe; or if the second guard period overlaps the downlink subframe, skipping, by the base station, scheduling the terminal in a first part of the downlink subframe or in the downlink subframe, or setting a scheduling priority of the terminal in a first part of the downlink subframe or in the downlink subframe to a lowest level, where the first part of the downlink subframe is an overlapping part between the second guard period and the downlink subframe.

In a third possible implementation manner of the twelfth aspect of the present invention, when the base station skips scheduling the terminal in the first part of the downlink subframe or in the downlink subframe, or sets the scheduling priority of the terminal in the first part of the downlink subframe or in the downlink subframe to the lowest level, if the downlink subframe includes the PHICH information sent to the terminal, the base station sends, in the Nth downlink subframe after the downlink subframe, the PHICH information to the terminal, where N is a positive integer greater than or equal to 1.

Embodiments of the present invention provide a half-duplex frequency division duplex communication method, a base station and a terminal. When the terminal switches from a downlink subframe to an adjacent uplink subframe, a generation module generates a first guard period, where that the terminal does not process any signal in the first guard period is defined, that is, the terminal neither receives downlink data nor sends an uplink signal in the first guard period, and therefore uncertainty of a terminal behavior during a downlink-to-uplink switching process of the terminal is avoided, and successful sending of the uplink subframe can be ensured; and when the terminal switches from an uplink subframe to a downlink subframe, the generation module generates a second guard period, where the second guard period overlaps the uplink subframe or the downlink subframe, and that the terminal does not process any signal in the second guard period is defined, and therefore uncertainty of a terminal behavior during an uplink-to-downlink switching process of the terminal is avoided. By defining new terminal behaviors, the embodiments of the present invention can ensure that a network and the terminal can normally transmit and receive data.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

FIG. 6 is a schematic structural diagram of still another base station according to Embodiment 6 of the present invention;

FIG. 7 is a flowchart of a half-duplex frequency division duplex communication method according to Embodiment 7 of the present invention;

FIG. 8 is a schematic diagram of a scenario during downlink-to-uplink switching of a terminal according to Embodiment 8 of the present invention;

FIG. 9 is a schematic diagram of a scenario during downlink-to-uplink switching of a terminal according to Embodiment 9 of the present invention;

FIG. 10 is a flowchart of a half-duplex frequency division duplex communication method according to Embodiment 10 of the present invention;

FIG. 11 is a flowchart of a half-duplex frequency division duplex communication method according to Embodiment 11 of the present invention;

FIG. 12 is a schematic diagram of a scenario during downlink-to-uplink switching of a terminal according to Embodiment 12 of the present invention;

FIG. 13 is a schematic diagram of a scenario during downlink-to-uplink switching of a terminal according to Embodiment 13 of the present invention;

FIG. 14 is a flowchart of a half-duplex frequency division duplex communication method according to Embodiment 14 of the present invention;

FIG. 15 is a flowchart of a half-duplex frequency division duplex communication method according to Embodiment 15 of the present invention;

FIG. 20 is a schematic diagram of a scenario during uplink-to-downlink switching of a terminal according to Embodiment 20 of the present invention;

FIG. 21 is a flowchart of a half-duplex frequency division duplex communication method according to Embodiment 21 of the present invention;

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
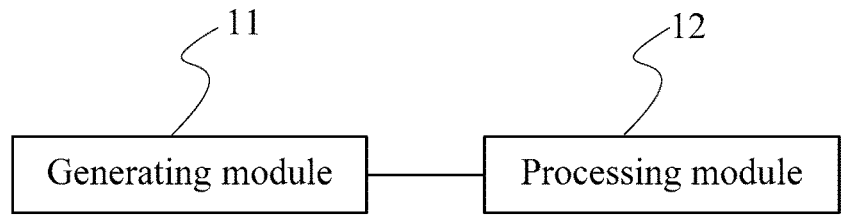
FIG. 1 is a schematic structural diagram of a terminal according to Embodiment 1 of the present invention.

FIG. 1 is a schematic structural diagram of a terminal according to Embodiment 1 of the present invention, where in this embodiment, a first guard period generated by the terminal is greater than or equal to 1 millisecond. As shown in FIG. 1, the terminal provided by this embodiment includes a generation module 11 and a processing module 12.

The generation module 11 is configured to: when data processing of the terminal switches from a downlink subframe to an adjacent uplink subframe, generate the first guard period, where the first guard period is greater than or equal to 1 millisecond.

The processing module 12 is configured to skip processing any signal in the first guard period.

In the embodiments of the present invention, switching from a downlink subframe to an adjacent uplink subframe refers to switching from a downlink subframe to an adjacent uplink subframe that lags behind the downlink subframe in a time domain, and switching from a downlink subframe to an adjacent uplink subframe that precedes the downlink subframe in the time domain is impossible to occur. In addition, the terminal mentioned in the embodiments of the present invention mainly refers to a low complexity-machine type communication (LC-MTC) terminal, where the LC-MTC terminal uses a half-duplex frequency division duplex (FDD) technology for communication, and the LC-MTC terminal generally uses an oscillator to maintain a downlink frequency and an uplink frequency. Certainly, the terminal may be another device that uses an oscillator to maintain the downlink frequency and the uplink frequency.

Because the terminal uses an oscillator to maintain the downlink frequency and the uplink frequency, when the terminal switches from downlink to uplink, the oscillator needs to switch a frequency from the downlink frequency to the uplink frequency, and an adjustment time is generated when the oscillator switches from the downlink frequency to the uplink frequency, that is, a time delay is generated when the oscillator switches from the downlink frequency to the uplink frequency. In this embodiment, when the terminal generates the first guard period, the frequency adjustment time of the oscillator is considered. Specifically, the generation module 11 generates the first guard period according to a round trip time (RTT) and a first switching time, where the first switching time includes: a frequency adjustment time and a power adjustment time, the frequency adjustment time is an adjustment time for switching from a downlink frequency to an uplink frequency by an oscillator of the terminal, and the power adjustment time is an adjustment time for adjusting a power of the terminal from 0 to an uplink transmit power. When the terminal switches from downlink to uplink, an initial value of the power of the terminal is 0, and before the terminal sends an uplink subframe, the power needs to be adjusted to meet the uplink transmit power of the terminal, and then the uplink subframe can be sent. The terminal generally implements power amplification by using an amplifier, and a time required by the amplifier of the terminal to adjust the power from 0 to the uplink transmit power is the power adjustment time. The RTT is defined by using the following formula: RTT=2X/C, where X represents a maximum distance from the terminal to a base station, and C represents the velocity of light. Considering a maximum coverage area of a cell in an evolved universal terrestrial radio access network (E-UTRAN), a maximum value of X is 100 km (kilometers), and when X is 100 km, it is calculated that a value of the RTT is 667 µs (microseconds) according to the foregoing formula, and therefore, a maximum value of the RTT is 667 µs. Certainly, the first switching time may further include other times, for example, the frequency adjustment time vary with different terminals that have different hardware, and therefore, a given time offset may also be set. This embodiment is different from the prior art: in the prior art, a frequency adjustment time and a power adjustment time that are generated when the terminal switches from downlink to uplink are not considered, and the guard period includes only the RTT, and therefore, in the prior art, when the terminal switches from downlink to uplink, values of the guard period are all less than 1 millisecond.

In this embodiment, when the generation module 11 generates the first guard period, the first switching time of switching from the downlink subframe to the adjacent uplink subframe by the terminal is considered, and because a value of the first switching time is not fixed, a sum of the first switching time and the RTT may have three values. Therefore, the final first guard period may also have three possible values: the first guard period is greater than 1 millisecond, less than 1 millisecond, and equal to 1 millisecond. In this embodiment, cases in which the first guard period is greater than 1 millisecond and equal to 1 millisecond are mainly introduced.

In a first case, the first guard period is greater than 1 millisecond. If the first guard period is greater than 1 millisecond, the generating, by the generation module 11, the first guard period according to a round trip time and a first switching time is specifically as follows: in an implementation manner, if the round trip time does not overlap the first switching time, the terminal uses a sum of the round trip time and the first switching time as the first guard period; in another implementation manner, if the round trip time partially overlaps the first switching time, the first guard period generated by the terminal is less than a sum of the round trip time and the first switching time, and the terminal may use a difference, which is obtained by subtracting an overlapping time between the first switching time and the round trip time from the sum of the first switching time and the round trip time, as the first guard period. When the first guard period is greater than 1 millisecond, if the first guard period overlaps the downlink subframe and a last part of an adjacent downlink subframe (the last part of a downlink subframe) immediately preceding the downlink subframe, the processing module 12 is specifically configured to: skip receiving a downlink signal in the downlink subframe and in the last part of the adjacent downlink subframe immediately preceding the downlink subframe, where the adjacent downlink subframe immediately preceding the downlink subframe refers to an adjacent downlink subframe that precedes the downlink subframe in the time domain. When the first guard period overlaps the downlink subframe and a last part of an uplink subframe immediately preceding the downlink subframe, the processing module 12 is specifically configured to: skip receiving a downlink signal in the downlink subframe, and skip sending an uplink signal in the last part of the uplink subframe immediately preceding the downlink subframe, where the uplink subframe immediately preceding the downlink subframe refers to an adjacent uplink subframe that precedes the downlink subframe in the time domain. In the first case, the downlink subframe is included in the first guard period, and therefore the base station may not waste any resource on scheduling the terminal in the downlink subframe, and for a first downlink subframe or an uplink subframe immediately preceding the downlink subframe, the base station may schedule the terminal in the first downlink subframe or uplink subframe immediately preceding the downlink subframe, but the terminal neither receives data in the downlink subframe immediately preceding the downlink subframe, nor sends data in the uplink subframe immediately preceding the downlink subframe.

In a second case, the first guard period is equal to 1 millisecond. If the first guard period is equal to 1 millisecond, the generating, by the generation module 11, the first guard period according to a round trip time and a first switching time is specifically: adding the round trip time and the first switching time, to obtain the first guard period, that is, using a sum of the round trip time and the first switching time as the first guard period. The first guard period and the downlink subframe overlap each other completely, and the terminal does not process any signal in the first guard period, which is specifically that the terminal does not receive a downlink signal in the downlink subframe. In this case, the first guard period and the downlink subframe overlap each other completely, and the base station may not schedule the terminal to receive downlink data in the downlink subframe.

This embodiment provides a terminal. When the terminal switches from a downlink subframe to an adjacent uplink subframe, a generation module generates a first guard period, where a first switching time for downlink-to-uplink switching of the terminal is considered when the first guard period is generated. In this embodiment, that the terminal does not process any signal in the first guard period is defined, that is, the terminal neither receives downlink data nor sends an uplink signal in the first guard period, and therefore uncertainty of a terminal behavior during a downlink-to-uplink switching process of the terminal is avoided, where the uncertainty of the terminal behavior refers to that the terminal cannot determine whether the terminal should receive data or send data; and successful sending of the uplink subframe can be ensured, thereby ensuring that a network and the terminal can normally transmit and receive data.

Figure 2:
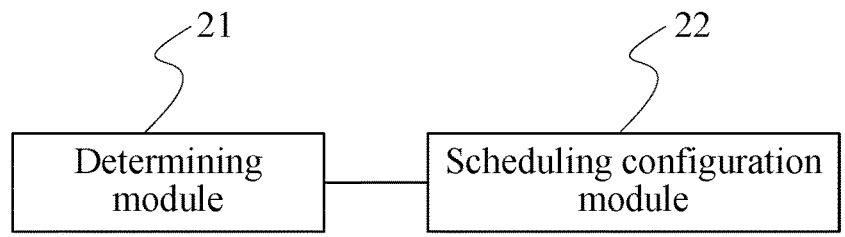
FIG. 2 is a schematic structural diagram of a base station according to Embodiment 2 of the present invention.

FIG. 2 is a schematic structural diagram of a base station according to Embodiment 2 of the present invention, and as shown in FIG. 2, the base station provided by this embodiment includes: a determining module 21 and a scheduling configuration module 22.

The determining module 21 is configured to: when data processing of a terminal switches from a downlink subframe to an adjacent uplink subframe, determine that a first guard period generated by the terminal overlaps the downlink subframe, where the first guard period is greater than or equal to 1 millisecond.

The scheduling configuration module 22 is configured to configure the base station to skip scheduling the terminal in the downlink subframe, or set a scheduling priority of the terminal in the downlink subframe to a lowest level.

When data processing of the terminal switches from the downlink subframe to the adjacent uplink subframe, the determining module 21 may determine, according to a value of the first guard period, whether the first guard period overlaps the downlink subframe, and if the first guard period is greater than or equal to 1 millisecond, the first guard period overlaps the downlink subframe. Specifically, when the first guard period is greater than 1 millisecond, the first guard period overlaps the downlink subframe and a last part of a first downlink subframe immediately preceding the downlink subframe, or the first guard period overlaps the downlink subframe and a last part of an uplink subframe immediately preceding the downlink subframe; and when the first guard period is equal to 1 millisecond, the first guard period and the downlink subframe overlap each other completely.

If the first guard period overlaps the downlink subframe and the last part of the first downlink subframe immediately preceding the downlink subframe, the scheduling configuration module 22 may configure the base station to skip scheduling the terminal in the downlink subframe, or set the scheduling priority of the terminal in the downlink subframe to the lowest level, while the base station may schedule the terminal in the first downlink subframe immediately preceding the downlink subframe. If the first guard period overlaps the downlink subframe and the last part of the uplink subframe immediately preceding the downlink subframe, the scheduling configuration module 22 may configure the base station to skip scheduling the terminal in the downlink subframe, or set the scheduling priority of the terminal in the downlink subframe to the lowest level, while the base station may schedule the terminal in the uplink subframe immediately preceding the downlink subframe. If the first guard period is equal to 1 millisecond, the scheduling configuration module 22 may configure the base station to skip scheduling the terminal in the downlink subframe, or set the scheduling priority of the terminal in the downlink subframe to the lowest level. When the scheduling configuration module 22 sets the scheduling priority of the terminal in the downlink subframe to the lowest level, the base station preferentially schedules other terminals in the downlink subframe.

This embodiment provides a base station. When data processing of a terminal switches from a downlink subframe to an adjacent uplink subframe, a determining module determines whether a first guard period generated by the terminal overlaps the downlink subframe, and when the first guard period generated by the terminal overlaps the downlink subframe, the terminal cannot correctly receive downlink data sent in the downlink subframe by the base station. In this embodiment, a scheduling configuration module configures the base station to skip scheduling the terminal in the downlink subframe or sets a scheduling priority of the terminal in the downlink subframe to a lowest level, thereby avoiding a waste of resources caused by that the base station sends downlink data to the terminal in the downlink subframe, and improving utilization of downlink resources.

Figure 3:
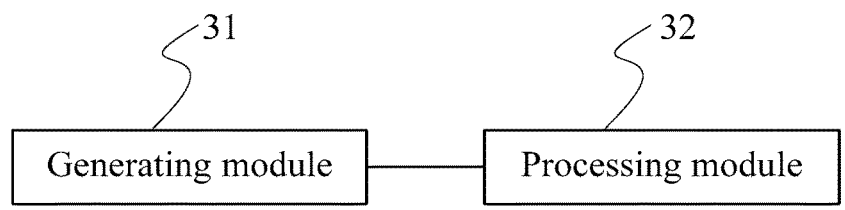
FIG. 3 is a schematic structural diagram of another terminal according to Embodiment 3 of the present invention.

FIG. 3 is a schematic structural diagram of another terminal according to Embodiment 3 of the present invention. In this embodiment, a first guard period generated by the terminal is less than 1 millisecond. As shown in FIG. 3, the terminal provided by this embodiment includes a generation module 31 and a processing module 32.

The generation module 31 is configured to: when data processing of the terminal switches from a downlink subframe to an adjacent uplink subframe, generate a first guard period, where the first guard period is less than 1 millisecond, the first guard period overlaps a last part of the downlink subframe, and the terminal is not scheduled by a base station in a last timeslot of the downlink subframe.

The processing module 32 is configured to skip receiving a downlink signal in the first guard period.

In this embodiment, the generation module 31 is specifically configured to: generate the first guard period according to a round trip time and a first switching time, where the first switching time includes: a frequency adjustment time and a power adjustment time, the frequency adjustment time is an adjustment time for switching from a downlink frequency to an uplink frequency by an oscillator of the terminal, and the power adjustment time is an adjustment time for adjusting a power from 0 to an uplink transmit power by the terminal. Specifically, if the first switching time is included in the round trip time, the generation module 31 may use the round trip time or the first switching time as the first guard period, and certainly, the first guard period may be of another value, for example, the generation module 31 uses a maximum value between the first switching time and the round trip time as the first guard period, or the first guard period is any value that is greater than a maximum value between the first switching time and the round trip time but less than 1 millisecond, which is not limited in the present invention. If the first switching time does not overlap the round trip time, the generation module 31 adds the round trip time and the first switching time, to obtain the first guard period, that is, uses a sum of the round trip time and the first switching time as the first guard period.

When the first guard period is less than 1 millisecond, the first guard period overlaps the last part of the downlink subframe, and the processing module 32 is specifically configured to: skip receiving a downlink signal in the last part of the downlink subframe. In this case, the first guard period partially overlaps the downlink subframe. If the first guard period is less than 0.5 milliseconds, the base station may schedule the downlink subframe, and if the first guard period is greater than or equal to 0.5 milliseconds and less than 1 millisecond, the last timeslot of the downlink subframe is included in the first guard period, where the downlink subframe includes two timeslots, and the first timeslot of the downlink subframe only partially overlaps the first guard period. Therefore, the base station may skip scheduling the terminal in the last timeslot of the downlink subframe, and the base station may schedule the terminal in the first timeslot of the downlink subframe; however, the terminal does not receive data that is in an overlapping part between the first timeslot and the first guard period.

This embodiment provides a terminal. When the terminal switches from a downlink subframe to an adjacent uplink subframe, a generation module generates a first guard period, where a first switching time for downlink-to-uplink switching of the terminal is considered when the first guard period is generated. In this embodiment, that the terminal does not process any signal in the first guard period is defined, that is, the terminal neither receives downlink data nor sends an uplink signal in the first guard period, and therefore uncertainty of a terminal behavior during a downlink-to-uplink switching process of the terminal is avoided, where the uncertainty of the terminal behavior refers to that the terminal cannot determine whether the terminal should receive data or send data; and successful sending of the uplink subframe can be ensured, thereby ensuring that a network and the terminal can normally transmit and receive data.

Figure 4:
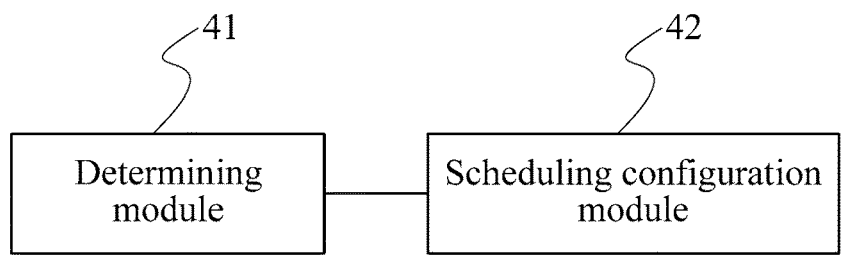
FIG. 4 is a schematic structural diagram of another base station according to Embodiment 4 of the present invention.

FIG. 4 is a schematic structural diagram of another base station according to Embodiment 4 of the present invention, and as shown in FIG. 4, the base station provided by this embodiment includes: a determining module 41 and a scheduling configuration module 42.

The determining module 41 is configured to: when data processing of a terminal switches from a downlink subframe to an adjacent uplink subframe, determine that a first guard period generated by the terminal overlaps a last timeslot of the downlink subframe, where the first guard period is less than 1 millisecond.

The scheduling configuration module 42 is configured to configure the base station to skip scheduling the terminal in the last timeslot of the downlink subframe, or set a scheduling priority of the terminal in the last timeslot of the downlink subframe to a lowest level.

The determining module 41 is specifically configured to: determine whether the first guard period generated by the terminal is greater than or equal to 0.5 milliseconds and less than 1 millisecond, and if yes, that is, if the first guard period is greater than or equal to 0.5 milliseconds and less than 1 millisecond, determine that the first guard period overlaps the last timeslot of the downlink subframe. The downlink subframe includes two timeslots. When the first guard period is greater than or equal to 0.5 milliseconds and less than 1 millisecond, the last timeslot of the downlink subframe is included in the first guard period, and the first timeslot of the downlink subframe only partially overlaps the first guard period. Therefore, the base station may skip scheduling the terminal in the last timeslot of the downlink subframe, and the base station may still schedule the terminal in the first timeslot of the downlink subframe; however, the terminal does not receive data that is in an overlapping part between the first timeslot and the first guard period.

If the first guard period overlaps the last timeslot of the downlink subframe, the scheduling configuration module 42 may configure the base station to skip scheduling the terminal in the last timeslot of the downlink subframe, or set the scheduling priority of the terminal in the last timeslot of the downlink subframe to the lowest level. When the scheduling configuration module 42 sets the scheduling priority of the terminal in the downlink subframe to the lowest level, the base station preferentially schedules other terminals in the downlink subframe.

This embodiment provides a base station. When data processing of a terminal switches from a downlink subframe to an adjacent uplink subframe, a determining module determines whether a first guard period generated by the terminal overlaps a last timeslot of the downlink subframe, and when the first guard period generated by the terminal overlaps the last timeslot of the downlink subframe, the terminal cannot correctly receive downlink data sent in the last timeslot of the downlink subframe by the base station. In this embodiment, a scheduling configuration module configures the base station to skip scheduling the terminal in the last timeslot of the downlink subframe or sets a scheduling priority of the terminal in the last timeslot of the downlink subframe to a lowest level, thereby avoiding a waste of resources caused by that the base station sends downlink data to the terminal in the last timeslot of the downlink subframe, and improving utilization of downlink resources.

Figure 5:
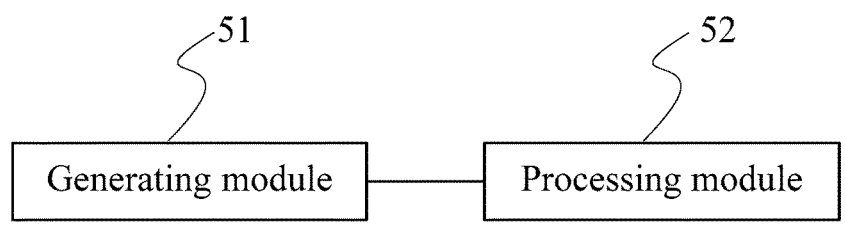
FIG. 5 is a schematic structural diagram of still another terminal according to Embodiment 5 of the present invention.

FIG. 5 is a schematic structural diagram of still another terminal according to Embodiment 5 of the present invention, and as shown in FIG. 5, the terminal provided by this embodiment includes: a generation module 51 and a processing module 52.

The generation module 51 is configured to: when data processing of the terminal switches from an uplink subframe to an adjacent downlink subframe, generate a second guard period.

The processing module 52 is configured to skip processing any signal in the second guard period, or configured to skip processing any signal in a subframe in which the second guard period is located.

When data processing of the terminal switches from the uplink subframe to the downlink subframe, the generation module 51 generates the second guard period. In the embodiments of the present invention, switching from an uplink subframe to an adjacent downlink subframe refers to switching from an uplink subframe to a downlink subframe that lags behind the uplink subframe in a time domain, and switching from an uplink subframe to an adjacent downlink subframe that precedes the uplink subframe is impossible to occur.

In a first optional implementation manner, the generation module 51 is specifically configured to: when data processing of a terminal switches from an uplink subframe to an adjacent downlink subframe, determine whether the downlink subframe includes physical hybrid automatic repeat request indicator channel PHICH information sent to the terminal. If the downlink subframe includes the PHICH information sent to the terminal, the generation module 51 generates the second guard period, where the generated second guard period overlaps the uplink subframe; or if the downlink subframe does not include the PHICH information sent to the terminal, the generation module 51 generates the second guard period, where the second guard period overlaps the downlink subframe.

In a second optional implementation manner, the generation module 51 is specifically configured to: when data processing of a terminal switches from an uplink subframe to an adjacent downlink subframe, determine whether the uplink subframe includes any one of the following uplink signals: a sounding reference signal SRS, a channel quality indicator CQI, and physical uplink control channel PUCCH information; if the uplink subframe includes any one of the uplink signals, generate the second guard period, where the generated second guard period overlaps the downlink subframe; or if the uplink subframe does not include any one of the uplink signals, generate the second guard period, where the generated second guard period overlaps the uplink subframe.

It should be noted that, the two optional implementation manners described above may also be applied to a process in which a terminal switches from a downlink subframe to an adjacent uplink subframe, that is, when the terminal generates a first guard period, it may also be determined, according to the two optional implementation manners described above, whether the generated first guard period overlaps the uplink subframe or the downlink subframe, and a specific process is not described herein again.

Because the terminal uses an oscillator to maintain a downlink frequency and an uplink frequency, when the terminal switches from uplink to downlink, the oscillator needs to switch a frequency from the uplink frequency to the downlink frequency, and an adjustment time is generated when the oscillator switches from the uplink frequency to the downlink frequency, that is, a time delay is generated when the oscillator switches from the uplink frequency to the downlink frequency. In this embodiment, when the terminal generates the second guard period, the frequency adjustment time of the oscillator is considered. In this embodiment, the generation module 51 is specifically configured to: generate the second guard period according to a round trip time and a second switching time, where the second switching time includes: a frequency adjustment time and a power adjustment time, the frequency adjustment time is an adjustment time for switching from an uplink frequency to a downlink frequency by an oscillator of the terminal, and the power adjustment time is an adjustment time for adjusting a downlink power of the terminal from 0 to a transmit power.

In this embodiment, if the second switching time is greater than the RTT, the generation module 51 may subtract the round trip time from the second switching time, to obtain the second guard period, that is, the second guard period is equal to a difference between the second switching time and the RTT, and certainly, the second guard period may be greater than the difference between the second switching time and the RTT. The second guard period overlaps the uplink subframe or an adjacent downlink subframe of the uplink subframe in the time domain. If the second switching time is less than or equal to the RTT, the generation module 51 does not generate the second guard period, that is, when the second switching time is less than or equal to the RTT, a second guard period does not need to be defined for the terminal. Therefore, it can be learned that the second guard period may be of the following possible values, which are separately described as follows:

In a first case, the second guard period is less than 1 millisecond, and the second guard period overlaps a last part of the uplink subframe, where the last part of the uplink subframe is an overlapping part between the second guard period and the uplink subframe; in this case, the processing module 52 is specifically configured to: skip sending an uplink signal in the last part of the uplink subframe, or skip sending an uplink signal in the uplink subframe. In this case, the second switching time is greater than the RTT, and the second guard period may be equal to a difference obtained by subtracting the RRT from the second switching time. The terminal is not scheduled by a base station in the second guard period, or the terminal is not scheduled by a base station in a subframe in which the second guard period is located. When the second guard period overlaps the last part of the uplink subframe, the base station does not schedule the terminal in the last part of the uplink subframe, or does not schedule the terminal in the uplink subframe. If the second guard period is equal to 0.5 milliseconds, where 0.5 milliseconds is a length of one timeslot, and the uplink subframe includes two timeslots, the base station may not schedule the terminal in the last timeslot of the uplink subframe.

In a second case, the second guard period is less than 1 millisecond, and the second guard period overlaps a first part of the downlink subframe, where the first part of the downlink subframe is an overlapping part between the second guard period and the downlink subframe; in this case, the processing module 52 is specifically configured to: skip receiving a downlink signal in the first part of the downlink subframe, or skip receiving a downlink signal in the downlink subframe. In this case, the second switching time is greater than the RTT, and the second guard period may be equal to a difference obtained by subtracting the RRT from the second switching time. The terminal is not scheduled by a base station in the second guard period, or the terminal is not scheduled by a base station in a subframe in which the second guard period is located. When the second guard period overlaps the first part of the downlink subframe, the base station does not schedule the terminal in the first part of the downlink subframe, or does not schedule the terminal in the downlink subframe. If the second guard period is equal to 0.5 milliseconds, the base station may not schedule the terminal in the first timeslot of the downlink subframe, where the downlink subframe includes two timeslots.

In a third case, the second guard period is equal to 1 millisecond, and the second guard period overlaps the downlink subframe; in this case, the processing module 52 is specifically configured to: skip receiving a downlink signal in the downlink subframe. The base station may not schedule the terminal in the downlink subframe.

In a fourth case, the second guard period is equal to 1 millisecond, and the second guard period overlaps the uplink subframe; in this case, the processing module 52 is specifically configured to: skip sending an uplink signal in the uplink subframe. The base station may not schedule the terminal in the uplink subframe.

In a fifth case, the second guard period is greater than or equal to 1 millisecond, and the second guard period overlaps the uplink subframe and an adjacent uplink subframe immediately preceding the uplink subframe, or the second guard period overlaps the downlink subframe and an adjacent downlink subframe immediately following the downlink subframe. The processing module 52 is specifically configured to: skip sending an uplink signal in the uplink subframe and the adjacent uplink subframe immediately preceding the uplink subframe, where the base station may not schedule the terminal in the uplink subframe; or skip receiving a downlink signal in the downlink subframe and the adjacent downlink subframe immediately following the downlink subframe, where the base station may not schedule the terminal in the downlink subframe.

In this embodiment, the downlink signal may include any one or more of: a physical downlink control channel (PDCCH) signal, an enhanced physical downlink control channel (EPDCCH) signal, a cell-specific reference signal (CRS), a multimedia broadcast multicast service single frequency network (MBSFN) signal, a service data signal, a physical hybrid automatic repeat request indicator channel (PHICH) signal, and a physical control format indicator channel (PCFICH) signal.

In this embodiment, some downlink signals are not carried in the entire downlink subframe, but are carried in a part of the downlink subframe, or may be carried in a first part, a last part or a middle part of the downlink subframe. In this case, if the second guard period overlaps the first part of the downlink subframe, when the terminal is configured by the base station to receive an EPDCCH signal in the downlink subframe, the processing module 52 is specifically configured to: skip receiving the EPDCCH signal or the downlink signal in the first part of the downlink subframe; when the terminal does not receive the EPDCCH signal in the first part of the downlink subframe, the terminal may receive other downlink signals except the EPDCCH signal in the first part of the downlink subframe, and when the terminal does not receive the downlink signal in the first part of the downlink subframe, the terminal does not receive any downlink signal in the first part of the downlink subframe.

When the second guard period overlaps the first part of the downlink subframe, if the terminal is configured by the base station to receive an MBSFN signal in the downlink subframe, the processing module 52 is specifically configured to: skip receiving the MBSFN signal or the downlink signal in the first part of the downlink subframe; when the terminal does not receive the MBSFN signal in the first part of the downlink subframe, the terminal may receive other downlink signals except the MBSFN signal in the first part of the downlink subframe, and when the terminal does not receive the downlink signal in the first part of the downlink subframe, the terminal does not receive any downlink signal in the first part of the downlink subframe.

If the second guard period overlaps the first part of the downlink subframe, the terminal may determine by itself whether to receive the downlink signal in the first part of the downlink subframe, which mainly includes the following three cases:

(1) If the terminal is configured by the base station to receive an EPDCCH signal in the downlink subframe, the processing module 52 is specifically configured to: determine whether the second guard period overlaps a receiving time of the EPDCCH signal; if the second guard period overlaps the receiving time of the EPDCCH signal, skip receiving the EPDCCH signal or the downlink signal in the downlink subframe; or if the second guard period does not overlap the receiving time of the EPDCCH signal, skip receiving the EPDCCH signal or the downlink signal in the first part of the downlink subframe.

(2) If the terminal is configured by the base station to receive an MBSFN signal in the downlink subframe, the processing module 52 is specifically configured to: determine whether the second guard period overlaps a receiving time of the MBSFN signal; if the second guard period overlaps the receiving time of the MBSFN signal, skip receiving the MB SFN signal or the downlink signal in the downlink subframe; or if the second guard period does not overlap the receiving time of the MBSFN signal, skip receiving the MBSFN signal or the downlink signal in the first part of the downlink subframe.

(3) If the terminal is configured by the base station to receive a physical downlink shared channel (PDSCH) signal in the downlink subframe, the processing module 52 is specifically configured to: determine whether a physical downlink control channel (PDCCH) signal corresponding to the PDSCH signal is included in the downlink subframe; if the PDCCH signal is included in the downlink subframe, skip receiving the PDSCH signal or the downlink signal in the downlink subframe; or if the PDCCH signal is not included in the downlink subframe, skip receiving the PDSCH signal or the downlink signal in the first part of the downlink subframe. When the terminal does not receive the PDSCH signal in the first part of the downlink subframe, the terminal may receive other downlink signals except the PDSCH signal in the first part of the downlink subframe, and when the terminal does not receive the downlink signal in the first part of the downlink subframe, the terminal does not receive any downlink signal in the first part of the downlink subframe.

In addition, when the terminal does not receive the downlink signal in the first part of the downlink subframe, or does not receive the downlink signal in the downlink subframe, the terminal determines whether the downlink subframe includes the PHICH information sent to the terminal, and if the downlink subframe includes the PHICH information sent to the terminal, the terminal receives, in the Nth downlink subframe after the downlink subframe, the PHICH information sent to the terminal, where N is a positive integer greater than or equal to 1. The determining, by the terminal, whether the downlink subframe includes the PHICH information sent to the terminal is specifically as follows: if the terminal sends physical uplink shared channel (PUSCH) information in the ith uplink subframe, the base station sends the PHICH information to the terminal in the (i+4)th subframe, to feed back whether the PUSCH information is successfully received; therefore, the terminal may determine whether the downlink subframe includes the PHICH information sent to the terminal. From the perspective of the base station, the base station also knows that the PHICH information needs to be fed back to the terminal in the fourth subframe after the terminal finishes sending the PUSCH information. In the solution of this embodiment, if the downlink subframe includes the PHICH information sent to the terminal, the base station may delay sending of the PHICH information by N subframes, and correspondingly the terminal receives, in the Nth subframe after the downlink subframe, the PHICH information sent to the terminal, so that when data processing of the terminal switches from the uplink subframe to the downlink subframe, loss of the PHICH information can be avoided.

This embodiment provides a terminal. When the terminal switches from an uplink subframe to a downlink subframe, a generation module generates a second guard period, where the second guard period overlaps the uplink subframe or the downlink subframe. In this embodiment, that the terminal does not process any signal in the second guard period is defined, that is, the terminal neither receives downlink data nor sends an uplink signal in the second guard period, and therefore uncertainty of a terminal behavior during an uplink-to-downlink switching process of the terminal is avoided, where the uncertainty of the terminal behavior refers to that the terminal cannot determine whether the terminal should receive data or send data, and therefore, this ensures that a network and the terminal can normally transmit and receive data.

FIG. 6 is a schematic structural diagram of still another base station according to Embodiment 6 of the present invention, and as shown in FIG. 6, the base station provided by this embodiment includes: a determining module 61 and a scheduling configuration module 62.

The determining module 61 is configured to: when data processing of a terminal switches from an uplink subframe to an adjacent downlink subframe, determine a second guard period generated by the terminal.

The scheduling configuration module 62 is configured to configure the base station to skip scheduling the terminal in the second guard period or in a subframe in which the second guard period is located, or set a scheduling priority of the terminal in the second guard period or in a subframe in which the second guard period is located to a lowest level.

The second guard period may be of the following three values: less than 1 millisecond, equal to 1 millisecond, and greater than 1 millisecond. When the second guard period is less than 1 millisecond, the second guard period overlaps a last part of the uplink subframe, where the last part of the uplink subframe is an overlapping part between the second guard period and the uplink subframe, or the second guard period overlaps a first part of the downlink subframe, where the first part of the downlink subframe is an overlapping part between the second guard period and the downlink subframe. When the second guard period is equal to 1 millisecond, the second guard period overlaps the uplink subframe, or overlaps the downlink subframe. When the second guard period is greater than or equal to 1 millisecond, the second guard period overlaps the uplink subframe and an adjacent uplink subframe immediately preceding the uplink subframe, or the second guard period overlaps the downlink subframe and an adjacent downlink subframe immediately following the downlink subframe.

In a first optional implementation manner, the determining module 61 is specifically configured to: when data processing of a terminal switches from an uplink subframe to an adjacent downlink subframe, determine whether the downlink subframe includes physical hybrid automatic repeat request indicator channel PHICH information sent to the terminal; if the downlink subframe includes the PHICH information sent to the terminal, determine that the second guard period overlaps the uplink subframe; or if the downlink subframe does not include the PHICH information sent to the terminal, determine that the second guard period overlaps the downlink subframe. Correspondingly, the scheduling configuration module 62 is specifically configured to: if the second guard period overlaps the uplink subframe, configure the base station to skip scheduling the terminal in a last part of the uplink subframe or in the uplink subframe, or set a scheduling priority of the terminal in a last part of the uplink subframe or in the uplink subframe to a lowest level, where the last part of the uplink subframe is an overlapping part between the second guard period and the uplink subframe; or if the second guard period overlaps the downlink subframe, configure the base station to skip scheduling the terminal in a first part of the downlink subframe or in the downlink subframe, or set a scheduling priority of the terminal in a first part of the downlink subframe or in the downlink subframe to a lowest level, where the first part of the downlink subframe is an overlapping part between the second guard period and the downlink subframe.

In a second optional implementation manner, the determining module 61 is specifically configured to: when data processing of a terminal switches from an uplink subframe to an adjacent downlink subframe, determine whether the uplink subframe includes any one of the following uplink signals: a sounding reference signal SRS, a channel quality indicator CQI, and physical uplink control channel PUCCH information; if the uplink subframe includes any one of the uplink signals, determine that the second guard period overlaps the downlink subframe; or if the uplink subframe does not include any one of the uplink signals, determine that the second guard period overlaps the uplink subframe. Correspondingly, the scheduling configuration module 62 is specifically configured to: if the second guard period overlaps the uplink subframe, configure the base station to skip scheduling the terminal in a last part of the uplink subframe or in the uplink subframe, or set a scheduling priority of the terminal in a last part of the uplink subframe or in the uplink subframe to a lowest level, where the last part of the uplink subframe is an overlapping part between the second guard period and the uplink subframe; or if the second guard period overlaps the downlink subframe, configure the base station to skip scheduling the terminal in a first part of the downlink subframe or in the downlink subframe, or set a scheduling priority of the terminal in a first part of the downlink subframe or in the downlink subframe to a lowest level, where the first part of the downlink subframe is an overlapping part between the second guard period and the downlink subframe.

It should be noted that, the two optional implementation manners described above may also be applied to a process in which a terminal switches from a downlink subframe to an adjacent uplink subframe, that is, when the base station determines a first guard period, it may also be determined, according to the two optional implementation manners described above, whether the first guard period overlaps the uplink subframe or the downlink subframe, and a specific process is not described herein again.

In this embodiment, when the base station does not schedule the terminal in the first part of the downlink subframe or the base station does not schedule the terminal in the downlink subframe, or sets the scheduling priority of the terminal in the first part of the downlink subframe or the scheduling priority of the terminal in the downlink subframe to the lowest level, the base station determines whether the downlink subframe includes the PHICH information sent to the terminal; and if the downlink subframe includes the PHICH information sent to the terminal, the base station sends, in the Nth downlink subframe after the downlink subframe, the PHICH information to the terminal, where N is a positive integer greater than or equal to 1. The determining, by the base station, whether the downlink subframe includes the PHICH information sent to the terminal is specifically as follows: if the terminal sends PUSCH information in the ith uplink subframe, the base station sends the PHICH information to the terminal in the (i+4)th subframe, to feed back whether the PUSCH information is successfully received; therefore, the base station may determine whether the downlink subframe includes the PHICH information sent to the terminal. Correspondingly, the terminal receives, in the Nth subframe after the downlink subframe, the PHICH information sent to the terminal, so that when data processing of the terminal switches from the uplink subframe to the downlink subframe, loss of the PHICH information can be avoided.

This embodiment provides a base station. When data processing of a terminal switches from a downlink subframe to an adjacent uplink subframe, a determining module determines a second guard period generated by the terminal, and the terminal cannot send or receive data normally in the second guard period. In this embodiment, a scheduling configuration module configures the base station to skip scheduling the terminal in the second guard period or in a subframe in which the second guard period is located, thereby avoiding a waste of resources caused by that the base station sends data to or receives data from the terminal in the second guard period, and improving utilization of resources.

FIG. 7 is a flowchart of a half-duplex frequency division duplex communication method according to Embodiment 7 of the present invention. This embodiment describes switching of a terminal from downlink receiving to uplink sending. As shown in FIG. 7, the method provided by this embodiment includes the following steps:

Step 101: When data processing of the terminal switches from a downlink subframe to an adjacent uplink subframe, the terminal generates a first guard period, where the first guard period is greater than or equal to 1 millisecond.

Because the terminal uses an oscillator to maintain a downlink frequency and an uplink frequency, when the terminal switches from downlink to uplink, the oscillator needs to switch a frequency from the downlink frequency to the uplink frequency, and an adjustment time is generated when the oscillator switches from the downlink frequency to the uplink frequency, that is, a time delay is generated when the oscillator switches from the downlink frequency to the uplink frequency. In this embodiment, when the terminal generates the first guard period, the frequency adjustment time of the oscillator is considered. Specifically, the terminal generates the first guard period according to a round trip time and a first switching time, where the first switching time includes: a frequency adjustment time and a power adjustment time, the frequency adjustment time is an adjustment time for switching from a downlink frequency to an uplink frequency by an oscillator of the terminal, and the power adjustment time is an adjustment time for adjusting a power of the terminal from 0 to an uplink transmit power. When the terminal switches from downlink to uplink, an initial value of the power of the terminal is 0, and before the terminal sends an uplink subframe, the power needs to be adjusted to meet the uplink transmit power of the terminal, and then the uplink subframe can be sent. The terminal generally implements power amplification by using an amplifier, and a time required by the amplifier of the terminal to adjust the power from 0 to the uplink transmit power is the power adjustment time. The round trip time RTT is defined by using the following formula: RTT=2X/C, where X represents a maximum distance from the terminal to a base station, and C represents the velocity of light. Considering a maximum coverage area of a cell in an E-UTRAN, a maximum value of X is 100 km, and when X is 100 km, it is calculated that a value of the RTT is 667 μs according to the foregoing formula, and therefore, a maximum value of the RTT is 667 μs. Certainly, the first switching time may further include other times, for example, considering different hardware of different terminals, the frequency adjustment time may be different, and therefore, a given time offset may also be set. This embodiment is different from the prior art: in the prior art, a frequency adjustment time and a power adjustment time that are generated when the terminal switches from downlink to uplink are not considered, and the guard period includes only the RTT, and therefore, in the prior art, when the terminal switches from downlink to uplink, values of the guard period are all less than 1 millisecond.

In this embodiment, when the terminal generates the first guard period, the first switching time of switching from the downlink subframe to the adjacent uplink subframe by the terminal is considered, and because a value of the first switching time is not fixed, a sum of the first switching time and the RTT may have three values. Therefore, the final first guard period may also have three possible values: the first guard period is greater than 1 millisecond, less than 1 millisecond, and equal to 1 millisecond. In this embodiment, cases in which the first guard period is greater than 1 millisecond and equal to 1 millisecond are mainly introduced.

In a first case, the first guard period is greater than 1 millisecond. If the first guard period is greater than 1 millisecond, the generating, the first guard period according to a round trip time and a first switching time is specifically as follows: in an implementation manner, if the round trip time does not overlap the first switching time, the terminal uses a sum of the round trip time and the first switching time as the first guard period, and in another implementation manner, if the round trip time partially overlaps the first switching time, the first guard period generated by the terminal is less than a sum of the round trip time and the first switching time, and the terminal may use a difference, which is obtained by subtracting an overlapping time between the first switching time and the round trip time from the sum of the first switching time and the round trip time, as the first guard period.

In a second case, the first guard period is equal to 1 millisecond. If the first guard period is equal to 1 millisecond, the generating, by the generation module 11, the first guard period according to a round trip time and a first switching time is specifically: adding the round trip time and the first switching time, to obtain the first guard period, that is, using a sum of the round trip time and the first switching time as the first guard period.

Step 102: The terminal skips processing any signal in the first guard period.

When the first guard period is greater than 1 millisecond, if the first guard period overlaps the downlink subframe and a last part of an adjacent downlink subframe (the last part of a downlink subframe) immediately preceding the downlink subframe, the skipping, by the terminal, processing any signal in the first guard period is specifically: skipping, by the terminal, receiving a downlink signal in the downlink subframe and in the last part of the adjacent downlink subframe immediately preceding the downlink subframe, where the adjacent downlink subframe immediately preceding the downlink subframe refers to an adjacent downlink subframe that precedes the downlink subframe in a time domain. When the first guard period overlaps the downlink subframe and a last part of an uplink subframe immediately preceding the downlink subframe, the skipping, by the terminal, processing any signal in the first guard period is specifically: skipping, by the terminal, receiving a downlink signal in the downlink subframe, and skipping sending an uplink signal in the last part of the uplink subframe immediately preceding the downlink subframe, where the uplink subframe immediately preceding the downlink subframe refers to an adjacent uplink subframe that precedes the downlink subframe in the time domain. In the first case, the downlink subframe is included in the first guard period, and therefore, the base station may not waste any resource on scheduling the terminal in the downlink subframe, and for a first downlink subframe or an uplink subframe immediately preceding the downlink subframe, the base station may schedule the terminal in the first downlink subframe or uplink subframe immediately preceding the downlink subframe, but the terminal neither receives data in the downlink subframe immediately preceding the downlink subframe, nor sends data in the uplink subframe immediately preceding the downlink subframe.

When the first guard period is equal to 1 millisecond, the first guard period and the downlink subframe overlap each other completely, and the skipping, by the terminal, processing any signal in the first guard period is specifically: skipping, by the terminal, receiving a downlink signal in the downlink subframe. In this case, the first guard period and the downlink subframe overlap each other completely, and the base station may not schedule the terminal in the downlink subframe, and the terminal does not receive data in the downlink subframe.

In the method provided by this embodiment, when a terminal switches from a downlink subframe to an adjacent uplink subframe, the terminal generates a first guard period, where a first switching time for downlink-to-uplink switching of the terminal is considered when the first guard period is generated. In this embodiment, that the terminal does not process any signal in the first guard period is defined, and therefore uncertainty of a terminal behavior during a downlink-to-uplink switching process of the terminal is avoided, where the uncertainty of the terminal behavior refers to that the terminal cannot determine whether the terminal should receive data or send data; and successful sending of the uplink subframe can be ensured, thereby ensuring that a network and the terminal can normally transmit and receive data.

The following describes the solution of Embodiment 7 in detail by using several specific embodiments. It should be noted that, in the figures of the present invention, DL (Downlink) represents downlink, and UL (Uplink) represents uplink.

Based on Embodiment 7 described above, Embodiment 8 of the present invention describes a half-duplex frequency division duplex communication method in detail by using an example in which a terminal switches from downlink to uplink and a first guard period is greater than 1 millisecond. FIG. 8 is a schematic diagram of a scenario during downlink-to-uplink switching of a terminal according to Embodiment 8 of the present invention.

In this embodiment, when the terminal switches from downlink receiving to uplink sending, the first guard period is set to be greater than 1 millisecond, that is, a sum of an RTT (including timing advance TA) and a first switching time is greater than 1 millisecond. As shown in FIG. 8, the terminal switches from a downlink subframe 1 to an uplink subframe 2, and the first guard period is a sum of the first switching time, which is the first half part, and the RTT, which is the second half part (an area shown by a dashed part in the figure); the terminal does not process any signal in the first guard period. Because the first guard period is greater than 1 millisecond, the downlink subframe 1 is included in the first guard period, and a last part of the downlink subframe 0 also overlaps the first guard period, where the downlink subframe 0 is a subframe immediately preceding the downlink subframe 1; the terminal does not receive any data in the downlink subframe 1, and does not receive any data in the last part (an overlapping area with the first guard period) of the downlink subframe 0 either. From the perspective of the base station, if the downlink subframe 1 is included in the first guard period, the base station may not waste any resource on scheduling the terminal in the downlink subframe 1, and the base station may schedule the terminal in the downlink subframe 0; however, the terminal may not receive downlink data in an overlapping area between the downlink subframe 0 and the first guard period.

In the method provided by this embodiment, a first guard period generated by a terminal is a sum of a first switching time and a round trip time, and that the terminal does not process any signal in the first guard period is defined, and therefore it is avoided that the terminal cannot determine a behavior thereof during the first switching time of downlink-to-uplink switching. Actually, in the first switching time, the terminal is adjusting a frequency and a power, and the terminal can neither send data nor receive data, and it is set that the terminal does not receive downlink data in the round trip time, which ensures successful sending of the uplink subframe, thereby ensuring that a network and the terminal can normally transmit and receive data.

Based on Embodiment 7 described above, Embodiment 9 of the present invention describes a half-duplex frequency division duplex communication method in detail by using an example in which a terminal switches from downlink to uplink and a first guard period is equal to 1 millisecond. FIG. 9 is a schematic diagram of a scenario during downlink-to-uplink switching of a terminal according to Embodiment 9 of the present invention.

In this embodiment, when the terminal switches from downlink receiving to uplink sending, the first guard period is set to be equal to 1 millisecond, that is, a sum of an RTT and a first switching time is equal to 1 millisecond. As shown in FIG. 9, the terminal switches from a downlink subframe 1 to an uplink subframe 2, and the first guard period is a sum of the first switching time, which is the first half part, and the RTT, which is the second half part (an area shown by a dashed part in the figure); in the first guard period, the terminal does not receive any downlink data in the downlink subframe 1. From the perspective of the base station, if the downlink subframe 1 and the first guard period overlap each other completely, the base station may not waste any resource on scheduling the terminal in the downlink subframe 1.

In the method provided by this embodiment, a first guard period generated by a terminal is a sum of a first switching time and a round trip time, and that the terminal does not process any signal in the first guard period is defined, and therefore it is avoided that the terminal cannot determine a behavior thereof during the first switching time of downlink-to-uplink switching. Actually, in the first switching time, the terminal is adjusting a frequency and a power, and the terminal can neither send data nor receive data, and it is set that the terminal does not receive downlink data in the round trip time, which ensures successful sending of the uplink subframe, thereby ensuring that a network and the terminal can normally transmit and receive data.

FIG. 10 is a flowchart of a half-duplex frequency division duplex communication method according to Embodiment 10 of the present invention. This embodiment describes switching of a terminal from downlink receiving to uplink sending. In this embodiment, a first guard period is greater than or equal to 1 millisecond, and as shown in FIG. 10, the method provided by this embodiment includes the following steps:

Step 201: When data processing of the terminal switches from a downlink subframe to an adjacent uplink subframe, a base station determines that a first guard period generated by the terminal overlaps the downlink subframe, where the first guard period is greater than or equal to 1 millisecond.

The determining, by a base station, that a first guard period generated by the terminal overlaps the downlink subframe is specifically: determining, by the base station, whether the first guard period generated by the terminal is greater than or equal to 1 millisecond; and if yes, that is, if the first guard period is greater than or equal to 1 millisecond, determining, by the base station, that the first guard period overlaps the downlink subframe. Specifically, when the first guard period is greater than 1 millisecond, the first guard period overlaps the downlink subframe and a last part of a first downlink subframe immediately preceding the downlink subframe, or the first guard period overlaps the downlink subframe and a last part of an uplink subframe immediately preceding the downlink subframe; and when the first guard period is equal to 1 millisecond, the first guard period and the downlink subframe overlap each other completely.

Step 202: The base station skips scheduling the terminal in the downlink subframe, or sets a scheduling priority of the terminal in the downlink subframe to a lowest level.

If the first guard period overlaps the downlink subframe and the last part of the first downlink subframe immediately preceding the downlink subframe, the base station does not schedule the terminal in the downlink subframe, or set the scheduling priority of the terminal in the downlink subframe to the lowest level; however, the base station may schedule the terminal in the first downlink subframe immediately preceding the downlink subframe. If the first guard period overlaps the downlink subframe and the last part of the uplink subframe immediately preceding the downlink subframe, the base station does not schedule the terminal in the downlink subframe, or set the scheduling priority of the terminal in the downlink subframe to the lowest level; however, the base station may schedule the terminal in the uplink subframe immediately preceding the downlink subframe. If the first guard period is equal to 1 millisecond, the base station does not schedule the terminal in the downlink subframe, or sets the scheduling priority of the terminal in the downlink subframe to the lowest level. When the scheduling priority of the terminal in the downlink subframe is the lowest level, the base station preferentially schedules other terminals in the downlink subframe.

In the method provided by this embodiment, when data processing of a terminal switches from a downlink subframe to an adjacent uplink subframe, a base station determines whether a first guard period generated by the terminal overlaps the downlink subframe, and when the first guard period generated by the terminal overlaps the downlink subframe, the terminal cannot normally receive downlink data sent in the downlink subframe by the base station. In this embodiment, the base station does not schedule the terminal in the downlink subframe or sets a scheduling priority of the terminal in the downlink subframe to a lowest level, thereby avoiding a waste of resources caused by that the base station sends downlink data to the terminal in the downlink subframe, and improving utilization of resources.

FIG. 11 is a flowchart of a half-duplex frequency division duplex communication method according to Embodiment 11 of the present invention. This embodiment describes switching of a terminal from downlink receiving to uplink sending. In this embodiment, a first guard period is less than 1 millisecond, and as shown in FIG. 11, the method provided by this embodiment includes the following steps:

Step 301: When data processing of the terminal switches from a downlink subframe to an adjacent uplink subframe, the terminal generates a first guard period, where the first guard period is less than 1 millisecond, the first guard period overlaps a last part of the downlink subframe, and the terminal is not scheduled by a base station in a last timeslot of the downlink subframe.

In this embodiment, the terminal generates the first guard period according to a round trip time and a first switching time, where the first switching time includes: a frequency adjustment time and a power adjustment time, the frequency adjustment time is an adjustment time for switching from a downlink frequency to an uplink frequency by an oscillator of the terminal, and the power adjustment time is an adjustment time for adjusting a power from 0 to an uplink transmit power by the terminal. Specifically, if the first switching time is included in the round trip time, the terminal uses the round trip time or the first switching time as the first guard period, and certainly, the first guard period may also be of another value, for example, the terminal uses a maximum value between the first switching time and the round trip time as the first guard period, or the first guard period is any value that is greater than a maximum value between the first switching time and the round trip time but less than 1 millisecond, which is not limited in the present invention. If the first switching time does not overlap the round trip time, the terminal adds the round trip time and the first switching time, to obtain the first guard period, that is, uses a sum of the round trip time and the first switching time as the first guard period.

Step 302: The terminal skips receiving a downlink signal in the first guard period.

When the first guard period is less than 1 millisecond, the first guard period overlaps the last part of the downlink subframe, and the skipping, by the terminal, receiving a downlink signal in the first guard period is specifically: skipping, by the terminal, receiving a downlink signal in the last part of the downlink subframe. In this case, the first guard period partially overlaps the downlink subframe. If the first guard period is less than 0.5 milliseconds, the base station may schedule the downlink subframe, and if the first guard period is greater than or equal to 0.5 milliseconds and less than 1 millisecond, the last timeslot of the downlink subframe is included in the first guard period, where the downlink subframe includes two timeslots, and the first timeslot of the downlink subframe only partially overlaps the first guard period. Therefore, the base station may skip scheduling the terminal in the last timeslot of the downlink subframe, and the base station may still schedule the first timeslot of the downlink subframe, for use by the terminal; however, the terminal does not receive data that is in an overlapping part between the first timeslot and the first guard period.

In the method provided by this embodiment, when a terminal switches from a downlink subframe to an adjacent uplink subframe, the terminal generates a first guard period, where a first switching time for downlink-to-uplink switching of the terminal is considered when the first guard period is generated. In this embodiment, that the terminal does not process any signal in the first guard period is defined, and therefore uncertainty of a terminal behavior during a downlink-to-uplink switching process of the terminal is avoided, where the uncertainty of the terminal behavior refers to that the terminal cannot determine whether the terminal should receive data or send data; and successful sending of the uplink subframe can be ensured, thereby ensuring that a network and the terminal can normally transmit and receive data.

Based on Embodiment 11 described above, Embodiment 12 of the present invention describes a half-duplex frequency division duplex communication method in detail by using an example in which a terminal switches from downlink to uplink and a first guard period is less than 1 ms. FIG. 12 is a schematic diagram of a scenario during downlink-to-uplink switching of a terminal according to Embodiment 12 of the present invention.

In this embodiment, when the terminal switches from downlink receiving to uplink sending, the first guard period is set to be less than 1 millisecond, and at this time, the first switching time is included in an RTT time; in this case, the first guard period is equal to the RTT. As shown in FIG. 12, when the terminal switches from a downlink subframe 1 to an uplink subframe 2, a start position of the first switching time is aligned with a start position of the uplink subframe 2, and in an actual application process, the start position of the first switching time is not necessarily aligned with the start position of the uplink subframe 2. The start position of the first switching time may be aligned with any position of the uplink subframe 2, and it is merely exemplary description in FIG. 12. Different from Embodiment 8, in this embodiment, the first switching time is included in the RTT, that is, the first switching time and the RTT overlap in a time domain. In a last part (a length of which is equal to the first guard period) of the downlink subframe 1, the terminal does not receive any downlink data. The base station may schedule the terminal in the downlink subframe 1, but the terminal does not receive data in the last part of the downlink subframe 1.

This embodiment provides a terminal; when the terminal switches from a downlink subframe to an adjacent uplink subframe, a generation module generates a first guard period, where a first switching time for downlink-to-uplink switching of the terminal is considered when the first guard period is generated. In this embodiment, that the terminal does not process any signal in the first guard period is defined, and therefore uncertainty of a terminal behavior during a downlink-to-uplink switching process of the terminal is avoided, where the uncertainty of the terminal behavior refers to that the terminal cannot determine whether the terminal should receive data or send data; and successful sending of the uplink subframe can be ensured, thereby ensuring that a network and the terminal can normally transmit and receive data.

Based on Embodiment 11 described above, Embodiment 13 of the present invention describes a half-duplex frequency division duplex communication method in detail by using an example in which a terminal switches from downlink to uplink and a first guard period is equal to 0.5 milliseconds. FIG. 13 is a schematic diagram of a scenario during downlink-to-uplink switching of a terminal according to Embodiment 13 of the present invention.

In this embodiment, when the terminal switches from downlink receiving to uplink sending, the first guard period is set to be equal to 0.5 milliseconds, that is, a sum of an RTT and a first switching time is equal to 0.5 milliseconds. As shown in FIG. 13, the terminal switches from a downlink subframe 1 to an uplink subframe 2, and the first guard period is a sum of the first switching time, which is the first half part, and the RTT, which is the second half part (an area shown by a dashed part in the figure); the first guard period and a last timeslot of the downlink subframe 1 overlap each other completely, and the terminal does not receive any downlink data in the last timeslot of the downlink subframe 1. From the perspective of the base station, if the last timeslot of the downlink subframe 1 and the first guard period overlap each other completely, the base station may not waste any resource on scheduling the terminal in the last timeslot of the downlink subframe 1.

In the method provided by this embodiment, a first guard period generated by a terminal is a sum of a first switching time and a round trip time, and that the terminal does not process any signal in the first guard period is defined, and therefore it is avoided that the terminal cannot determine a behavior thereof during the first switching time of downlink-to-uplink switching. Actually, in the first switching time, the terminal is adjusting a frequency and a power, and the terminal can neither send data nor receive data, and it is set that the terminal does not receive downlink data in the round trip time, which ensures successful sending of the uplink subframe, thereby ensuring that a network and the terminal can normally transmit and receive data.

In this embodiment, when the first guard period is set to 0.5 milliseconds, if the first switching time is included in the RTT time, that is, if the first switching time and the RTT overlap in the time domain, in this case, the first guard period is equal to the RTT. When the terminal switches from the downlink subframe 1 to the uplink subframe 2, in this embodiment, a start position of the first switching time is aligned with a start position of the uplink subframe 2; however, in an actual application process, the start position of the first switching time is not necessarily aligned with the start position of the uplink subframe 2, and the start position of the first switching time may be aligned with any position of the uplink subframe 2. In this case, the last timeslot of the downlink subframe 1 and the first guard period overlap each other completely, and therefore, the terminal does not receive any downlink data in the last timeslot of the downlink subframe 1. The base station may not waste any resource on scheduling the terminal in the last timeslot of the downlink subframe 1.

If the first switching time is included in the RTT time, the first guard period is equal to the RTT time. That the terminal does not process any signal in the first guard period is defined, and therefore it is avoided that the terminal cannot determine a behavior thereof in the first switching time of downlink-to-uplink switching. Actually, in the first switching time, the terminal is adjusting a frequency and a power, and the terminal can neither send data nor receive data, which is different from the prior art; in the prior art, to ensure successful sending of the uplink subframe, it is specified that the terminal can send uplink data but cannot receive data in the round trip time, and in this embodiment, the terminal can neither receive downlink data nor send uplink data in the first guard period.

FIG. 14 is a flowchart of a half-duplex frequency division duplex communication method according to Embodiment 14 of the present invention. This embodiment describes switching of a terminal from downlink receiving to uplink sending. As shown in FIG. 14, the method provided by this embodiment includes the following steps:

Step 401: When data processing of the terminal switches from a downlink subframe to an adjacent uplink subframe, a base station determines that a first guard period generated by the terminal overlaps a last timeslot of the downlink subframe, where the first guard period is less than 1 millisecond.

Specifically, the terminal determines whether the first guard period generated by the terminal is greater than or equal to 0.5 milliseconds and less than 1 millisecond, and if yes, that is, if the first guard period is greater than or equal to 0.5 milliseconds and less than 1 millisecond, the terminal determines that the first guard period overlaps the last timeslot of the downlink subframe. The downlink subframe includes two timeslots. When the first guard period is greater than or equal to 0.5 milliseconds and less than 1 millisecond, the last timeslot of the downlink subframe is included in the first guard period, and the first timeslot of the downlink subframe only partially overlaps the first guard period. Therefore, the base station may skip scheduling the terminal in the last timeslot of the downlink subframe, and the base station may still schedule the first timeslot of the downlink subframe, for use by the terminal; however, the terminal does not receive data that is in an overlapping part between the first timeslot and the first guard period.

Step 402: The base station skips scheduling the terminal in the last timeslot of the downlink subframe, or sets a scheduling priority of the terminal in the last timeslot of the downlink subframe to a lowest level.

If the first guard period overlaps the last timeslot of the downlink subframe, the base station may skip scheduling the terminal in the last timeslot of the downlink subframe, or set the scheduling priority of the terminal in the last timeslot of the downlink subframe to the lowest level. When the scheduling priority of the terminal in the downlink subframe is set to the lowest level, the base station preferentially schedules other terminals in the downlink subframe.

In the method provided by this embodiment, when data processing of a terminal switches from a downlink subframe to an adjacent uplink subframe, a base station determines whether a first guard period generated by the terminal overlaps a last timeslot of the downlink subframe, and when the first guard period generated by the terminal overlaps the last timeslot of the downlink subframe, the terminal cannot correctly receive downlink data sent in the last timeslot of the downlink subframe by the base station. In this embodiment, the base station does not schedule the terminal in the last timeslot of the downlink subframe or sets a scheduling priority of the terminal in the last timeslot of the downlink subframe to a lowest level, thereby avoiding a waste of resources caused by that the base station sends downlink data to the terminal in the last timeslot of the downlink subframe, and improving utilization of resources.

FIG. 15 is a flowchart of a half-duplex frequency division duplex communication method according to Embodiment 15 of the present invention. This embodiment describes switching of a terminal from uplink sending to downlink receiving. As shown in FIG. 15, the method provided by this embodiment includes the following steps:

Step 501: When data processing of the terminal switches from an uplink subframe to an adjacent downlink subframe, the terminal generates a second guard period.

Because the terminal uses an oscillator to maintain a downlink frequency and an uplink frequency, when the terminal switches from uplink to downlink, the oscillator needs to switch a frequency from the uplink frequency to the downlink frequency, and an adjustment time is generated when the oscillator switches from the uplink frequency to the downlink frequency, that is, a time delay is generated when the oscillator switches from the uplink frequency to the downlink frequency. In this embodiment, when the terminal generates a second guard period, the frequency adjustment time of the oscillator is considered. In this embodiment, the terminal generates the second guard period according to a round trip time and a second switching time, where the second switching time includes: a frequency adjustment time and a power adjustment time, the frequency adjustment time is an adjustment time for switching from an uplink frequency to a downlink frequency by an oscillator of the terminal, and the power adjustment time is an adjustment time for adjusting a power of the terminal from 0 to a transmit power.

If the second switching time is greater than the RTT, the terminal may subtract the round trip time from the second switching time, to obtain the second guard period, that is, the second guard period is equal to a difference between the second switching time and the RTT, and certainly, the second guard period may also be greater than the difference between the second switching time and the RTT. The second guard period overlaps the uplink subframe or an adjacent downlink subframe of the uplink subframe in the time domain. If the second switching time is less than or equal to the RTT, the terminal does not generate the second guard period, that is, when the second switching time is less than or equal to the RTT, it is unnecessary to define a second guard period for the terminal.

In a first optional implementation manner, the generating, by the terminal, a second guard period is specifically: determining, by the terminal, whether the downlink subframe includes physical hybrid automatic repeat request indicator channel PHICH information sent to the terminal; if the downlink subframe includes the PHICH information sent to the terminal, generating, by the terminal, the second guard period, where the generated second guard period overlaps the uplink subframe; or if the downlink subframe does not include the PHICH information sent to the terminal, generating, by the terminal, the second guard period, where the generated second guard period overlaps the downlink subframe.

In a second optional implementation manner, the generating, by the terminal, a second guard period is specifically: determining, by the terminal, whether the uplink subframe includes any one of the following uplink signals: a sounding reference signal SRS, a channel quality indicator CQI, and physical uplink control channel PUCCH information; if the uplink subframe includes any one of the uplink signals, generating, by the terminal, the second guard period, where the generated second guard period overlaps the downlink subframe; or if the uplink subframe does not include any one of the uplink signals, generating, by the terminal, the second guard period, where the generated second guard period overlaps the uplink subframe.

It should be noted that, the two optional implementation manners described above may also be applied to a process in which a terminal switches from a downlink subframe to an adjacent uplink subframe, that is, when the terminal generates a first guard period, it may also be determined, according to the two optional implementation manners described above, whether the generated first guard period overlaps the uplink subframe or the downlink subframe, and a specific process is not described herein again.

Step 502: The terminal skips processing any signal in the second guard period, or skips processing any signal in a subframe in which the second guard period is located.

It can be known from the above that the second guard period may be of the following possible values, which are separately described as follows:

In a first case, the second guard period is less than 1 millisecond, and the second guard period overlaps a last part of the uplink subframe, where the last part of the uplink subframe is an overlapping part between the second guard period and the uplink subframe; in this case, the skipping, by the terminal, processing any signal in the second guard period is specifically: skipping, by the terminal, sending an uplink signal in the last part of the uplink subframe; and the skipping, by the terminal, processing any signal in a subframe in which the second guard period is located is specifically: skipping, by the terminal, sending an uplink signal in the uplink subframe. In this case, the second switching time is greater than the RTT, and the second guard period may be equal to a difference obtained by subtracting the RRT from the second switching time. The terminal is not scheduled by a base station in the second guard period, or the terminal is not scheduled by a base station in a subframe in which the second guard period is located. If the second guard period is equal to 0.5 milliseconds, where 0.5 milliseconds is a length of one timeslot, and the uplink subframe includes two timeslots, the base station may not schedule the terminal in the last timeslot of the uplink subframe.

In a first case, the second guard period is less than 1 millisecond, and the second guard period overlaps a first part of the downlink subframe, where the first part of the downlink subframe is an overlapping part between the second guard period and the downlink subframe; in this case, the skipping, by the terminal, processing any signal in the second guard period is specifically: skipping, by the terminal, receiving a downlink signal in the first part of the downlink subframe; and the skipping, by the terminal, processing any signal in a subframe in which the second guard period is located is specifically: skipping, by the terminal, receiving a downlink signal in the downlink subframe. In this case, the second switching time is greater than the RTT, and the second guard period may be equal to a difference obtained by subtracting the RRT from the second switching time. The terminal is not scheduled by a base station in the second guard period, or the terminal is not scheduled by a base station in a subframe in which the second guard period is located. When the second guard period overlaps the first part of the downlink subframe, the base station does not schedule the terminal in the first part of the downlink subframe, or does not schedule the terminal in the downlink subframe. If the second guard period is equal to 0.5 milliseconds, the base station may not schedule the terminal in the first timeslot of the downlink subframe, where the downlink subframe includes two timeslots.

In a third case, the second guard period is equal to 1 millisecond, and the second guard period overlaps the downlink subframe; in this case, the skipping, by the terminal, processing any signal in the second guard period is specifically: skipping, by the terminal, receiving a downlink signal in the downlink subframe; and the skipping, by the terminal, processing any signal in a subframe in which the second guard period is located is specifically: skipping, by the terminal, receiving a downlink signal in the downlink subframe.

In a fourth case, the second guard period is equal to 1 millisecond, and the second guard period overlaps the uplink subframe; in this case, the skipping, by the terminal, processing any signal in the second guard period is specifically: skipping, by the terminal, sending an uplink signal in the uplink subframe; and the skipping, by the terminal, processing any signal in a subframe in which the second guard period is located is specifically: skipping, by the terminal, sending an uplink signal in the uplink subframe.

In a fifth case, the second guard period is greater than or equal to 1 millisecond, and the second guard period overlaps the uplink subframe and an adjacent uplink subframe immediately preceding the uplink subframe, or the second guard period overlaps the downlink subframe and an adjacent downlink subframe immediately following the downlink subframe. The terminal does not send an uplink signal in the uplink subframe and the adjacent uplink subframe immediately preceding the uplink subframe, and the base station may not schedule the terminal in the uplink subframe. Alternatively, the terminal does not receive a downlink signal in the downlink subframe and the adjacent downlink subframe immediately following the downlink subframe, and the base station may not schedule the terminal in the downlink subframe.

In this embodiment, the downlink signal includes any one or more of: a PDCCH signal, an EPDCCH signal, a CRS signal, an MBSFN signal, a service data signal, a PHICH signal, and a PCFICH signal.

In this embodiment, some downlink signals are not carried in the entire downlink subframe, but are carried in part of the downlink subframe, and may be carried in a first part, a last part or a middle part of the downlink subframe. In this case, if the second guard period overlaps the first part of the downlink subframe, when the terminal is configured by the base station to receive an EPDCCH signal in the downlink subframe, the skipping, by the terminal, receiving a downlink signal in the first part of the downlink subframe is specifically that: skipping, by the terminal, receiving the EPDCCH signal or the downlink signal in the first part of the downlink subframe. If the terminal is configured by the base station to receive an MB SFN signal in the downlink subframe, the skipping, by the terminal, receiving a downlink signal in the first part of the downlink subframe is specifically: skipping, by the terminal, receiving the MBSFN signal or the downlink signal in the first part of the downlink subframe. The first part of the downlink subframe refers to an overlapping part between the downlink subframe and the second guard period.

If the second guard period overlaps the first part of the downlink subframe, the terminal may also determine by itself whether to receive the downlink signal in the first part of the downlink subframe, which mainly includes the following three cases:

(1) If the terminal is configured by the base station to receive an EPDCCH signal in the downlink subframe, the skipping, by the terminal, receiving a downlink signal in the first part of the downlink subframe is specifically: determining, by the terminal, whether the second guard period overlaps a receiving time of the EPDCCH signal; if the second guard period overlaps the receiving time of the EPDCCH signal, skipping, by the terminal, receiving the EPDCCH signal or the downlink signal in the downlink subframe; or if the second guard period does not overlap the receiving time of the EPDCCH signal, skipping, by the terminal, receiving the EPDCCH signal or the downlink signal in the first part of the downlink subframe.

(2) If the terminal is configured by the base station to receive an MBSFN signal in the downlink subframe, the skipping, by the terminal, receiving a downlink signal in the first part of the downlink subframe is specifically: determining, by the terminal, whether the second guard period overlaps a receiving time of the MBSFN signal; if the second guard period overlaps the receiving time of the MBSFN signal, skipping, by the terminal, receiving the MBSFN signal or the downlink signal in the downlink subframe; or if the second guard period does not overlap the receiving time of the MBSFN signal, skipping, by the terminal, receiving the MB SFN signal or the downlink signal in the first part of the downlink subframe.

(3) If the terminal is configured by the base station to receive a physical downlink shared channel (PDSCH) signal in the downlink subframe, the skipping, by the terminal, receiving a downlink signal in the first part of the downlink subframe is specifically: determining, by the terminal, whether a PDCCH signal corresponding to the PDSCH signal is included in the downlink subframe; if the PDCCH signal is included in the downlink subframe, skipping, by the terminal, receiving the PDSCH signal or the downlink signal in the downlink subframe; or if the PDCCH signal is not included in the downlink subframe, skipping, by the terminal, receiving the PDSCH signal or the downlink signal in the first part of the downlink subframe.

In this embodiment, when the terminal skips receiving the downlink signal in the first part of the downlink subframe, or skips receiving the downlink signal in the downlink subframe, the terminal determines whether the downlink subframe includes the PHICH information sent to the terminal, and if the downlink subframe includes the PHICH information sent to the terminal, the terminal receives, in the Nth downlink subframe after the downlink subframe, the PHICH information sent to the terminal, where N is a positive integer greater than or equal to 1. The determining, by the terminal, whether the downlink subframe includes the PHICH information sent to the terminal is specifically as follows: if the terminal sends PUSCH information in the ith uplink subframe, the base station sends the PHICH information to the terminal in the (i+4)th subframe, to feed back whether the PUSCH information is successfully received; therefore, the terminal may determine whether the downlink subframe includes the PHICH information sent to the terminal. From the perspective of the base station, the base station also knows that the PHICH information needs to be fed back to the terminal in the fourth subframe after the terminal finishes sending the PUSCH information. In the solution of this embodiment, if the downlink subframe includes the PHICH information sent to the terminal, the base station may delay sending of the PHICH information by N subframes, and correspondingly, the terminal receives, in the Nth subframe after the downlink subframe, the PHICH information sent to the terminal, so that when data processing of the terminal switches from the uplink subframe to the downlink subframe, loss of the PHICH information can be avoided.

In the method provided by this embodiment, when a terminal switches from an uplink subframe to a downlink subframe, the terminal generates a second guard period, where the second guard period overlaps the uplink subframe or the downlink subframe. In this embodiment, that the terminal does not process any signal in the second guard period is defined, and therefore uncertainty of a terminal behavior during an uplink-to-downlink switching process of the terminal is avoided, where the uncertainty of the terminal behavior refers to that the terminal cannot determine whether the terminal should receive data or send data; therefore, this ensures that a network and the terminal can normally transmit and receive data.

The following describes the solution of Embodiment 15 in detail by using several specific embodiments.

Figure 16:
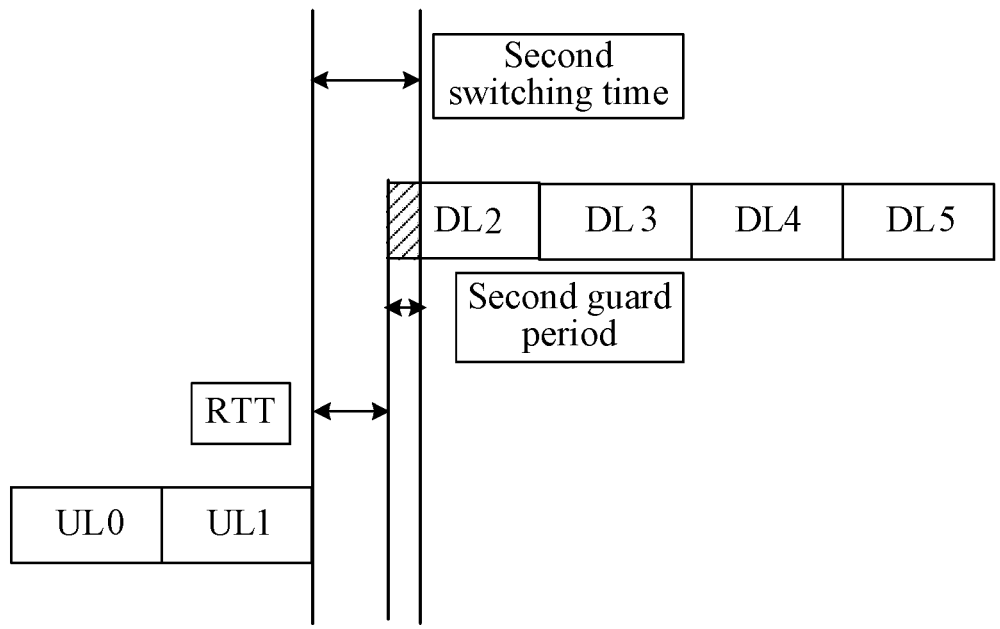
FIG. 16 is a schematic diagram of a scenario during uplink-to-downlink switching of a terminal according to Embodiment 16 of the present invention.

Based on Embodiment 15 described above, Embodiment 16 of the present invention describes a half-duplex frequency division duplex communication method in detail by using an example in which a terminal switches from uplink to downlink and a second guard period overlaps a first part of a downlink subframe in a time domain. FIG. 16 is a schematic diagram of a scenario during uplink-to-downlink switching of a terminal according to Embodiment 16 of the present invention.

In this embodiment, when the terminal switches from uplink sending to downlink receiving, if a second switching time is greater than an RTT, and the terminal starts switching after finishing sending an uplink subframe, the second switching time overlaps the downlink subframe. As shown in FIG. 16, the terminal switches from an uplink subframe 1 to a downlink subframe 2, and a time needed for switching is the second switching time. Because the second switching time is greater than an RTT between the terminal and a base station, the second switching time partially overlaps a first part of the downlink subframe 2. Therefore, a second guard period needs to be defined, where the second guard period is a time-domain overlapping area between the second switching time and the downlink subframe 2, that is, a value of the second guard period is equal to the second switching time minus the RTT, and the second guard period is less than 1 millisecond. When the second guard period is less than 1 millisecond, in one case, the terminal does not receive downlink data in the second guard period, but the base station can still schedule the downlink subframe 2 in which the second guard period is located, for use by the terminal; and in another case, the terminal does not receive downlink data in the downlink subframe 2 in which the second guard period is located, and the base station cannot schedule the terminal in the downlink subframe 2.

In the method provided by this embodiment, when a terminal switches from uplink to downlink, a second guard period overlaps a first part of a downlink subframe, and that the terminal does not receive downlink data in the second guard period or that the terminal does not receive downlink data in a downlink subframe in which the second guard period is located is defined, and therefore it is avoided that the terminal cannot determine a behavior thereof in the second guard period, so that an uplink subframe of the terminal can be sent successfully, thereby ensuring that a network and the terminal can normally transmit and receive data.

Figure 17:
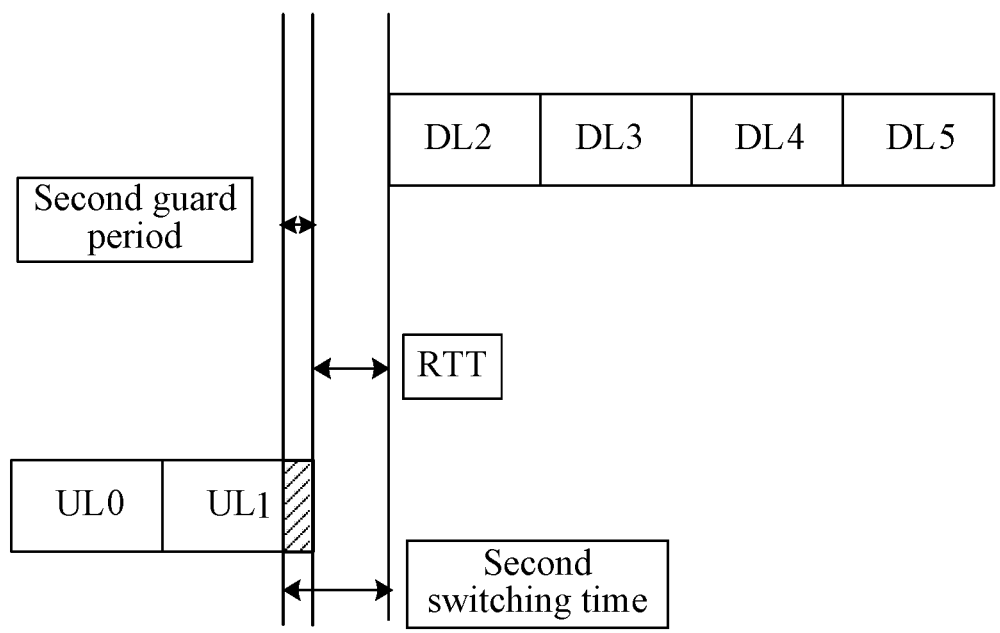
FIG. 17 is a schematic diagram of a scenario during uplink-to-downlink switching of a terminal according to Embodiment 17 of the present invention.

Based on Embodiment 15 described above, Embodiment 17 of the present invention describes a half-duplex frequency division duplex communication method in detail by using an example in which a terminal switches from uplink to downlink and a second guard period overlaps a last part of an uplink subframe in a time domain. FIG. 17 is a schematic diagram of a scenario during uplink-to-downlink switching of a terminal according to Embodiment 17 of the present invention.

In this embodiment, when a terminal switches from uplink sending to downlink receiving, if a second switching time is greater than an RTT, and the terminal starts switching before finishing sending an uplink subframe and finishes switching at a start position of a downlink subframe, the second switching time overlaps a first part of the uplink subframe. As shown in FIG. 17, the terminal switches from an uplink subframe 1 to a downlink subframe 2, and a time needed for switching is the second switching time. If the second switching time is greater than an RTT time between the terminal and a base station, and if the terminal starts switching before finishing sending the uplink subframe 1, the second switching time partially overlaps a last part of the uplink subframe 1. Therefore, a second guard period needs to be defined, where the second guard period is a time-domain overlapping area between the second switching time and the uplink subframe 1, that is, a value of the second guard period is equal to the second switching time minus the RTT, and the second guard period is less than 1 millisecond. When the second guard period is less than 1 millisecond, in one case, the terminal does not send uplink data in the second guard period, but the base station can still schedule the uplink subframe 1 for use by the terminal; and in another case, the terminal does not send uplink data in the uplink subframe 1 in which the second guard period is located, and the base station cannot schedule the uplink subframe 1 for use by the terminal.

In the method provided by this embodiment, when a terminal switches from uplink to downlink, a second guard period overlaps a last part of an uplink subframe, and that the terminal does not send uplink data in the second guard period is defined, and therefore it is avoided that the terminal cannot determine a behavior thereof in the second guard period, so that a downlink subframe of the terminal can be received successfully, thereby ensuring that a network and the terminal can normally transmit and receive data.

A difference between Embodiment 16 and Embodiment 17 lies in that the terminal starts switching at different moments; in Embodiment 16, the terminal starts switching before finishing sending the uplink subframe and finishes switching at the start position of the downlink subframe, while in Embodiment 17, the terminal starts switching immediately after the uplink subframe ends. Due to different switching mechanisms, the second guard period is located in different subframes; however, a size of an overlapping area may be the same, that is, a value of the second guard period may be the same.

Figure 18:
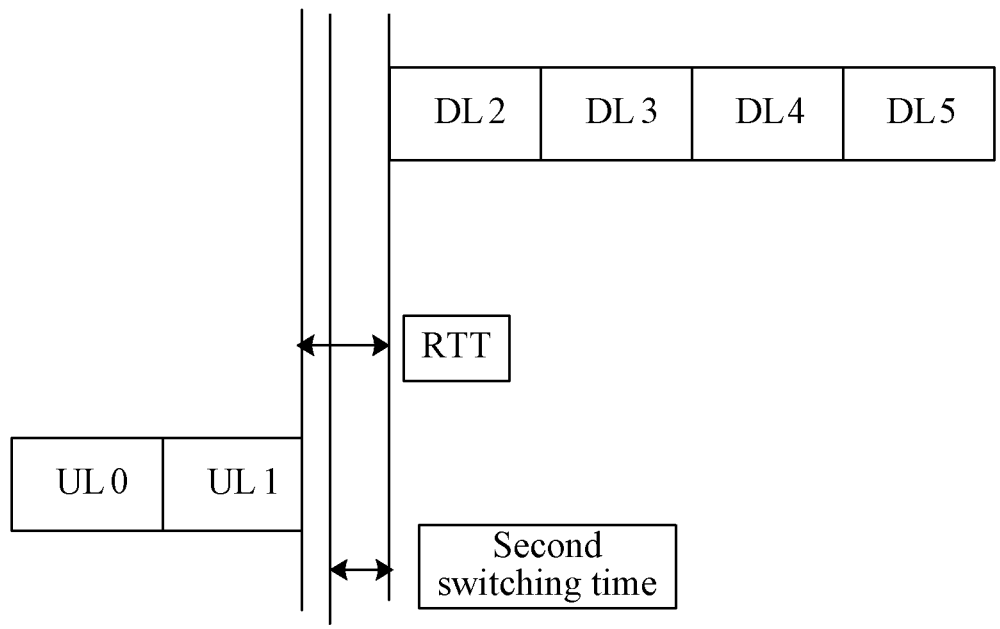
FIG. 18 is a schematic diagram of a scenario during uplink-to-downlink switching of a terminal according to Embodiment 18 of the present invention.

Based on Embodiment 15 described above, Embodiment 18 of the present invention describes a half-duplex frequency division duplex communication method in detail by using an example in which a terminal switches from uplink to downlink and a second guard period does not overlap an uplink subframe or a downlink subframe in a time domain. FIG. 18 is a schematic diagram of a scenario during uplink-to-downlink switching of a terminal according to Embodiment 18 of the present invention.

In this embodiment, when a terminal switches from uplink sending to downlink receiving, if a second switching time is less than an RTT, the second switching time neither overlaps an uplink subframe nor overlaps a downlink subframe. As shown in FIG. 18, the terminal switches from an uplink subframe 1 to a downlink subframe 2, and a time needed for switching is the second switching time. If the second switching time is less than or equal to an RTT between the terminal and a base station, the second switching time does not affect the uplink subframe 1 or the downlink subframe 2 at all, and therefore, the terminal may consider that the second guard period is zero.

In the method provided by this embodiment, when a terminal switches from uplink to downlink, if a second switching time of uplink-to-downlink switching of the terminal is less than a round trip time, the terminal can finish the uplink-to-downlink switching in the round trip time, and therefore, it is unnecessary to define a second guard period for the terminal, and the terminal can send and receive data normally.

Figure 19:
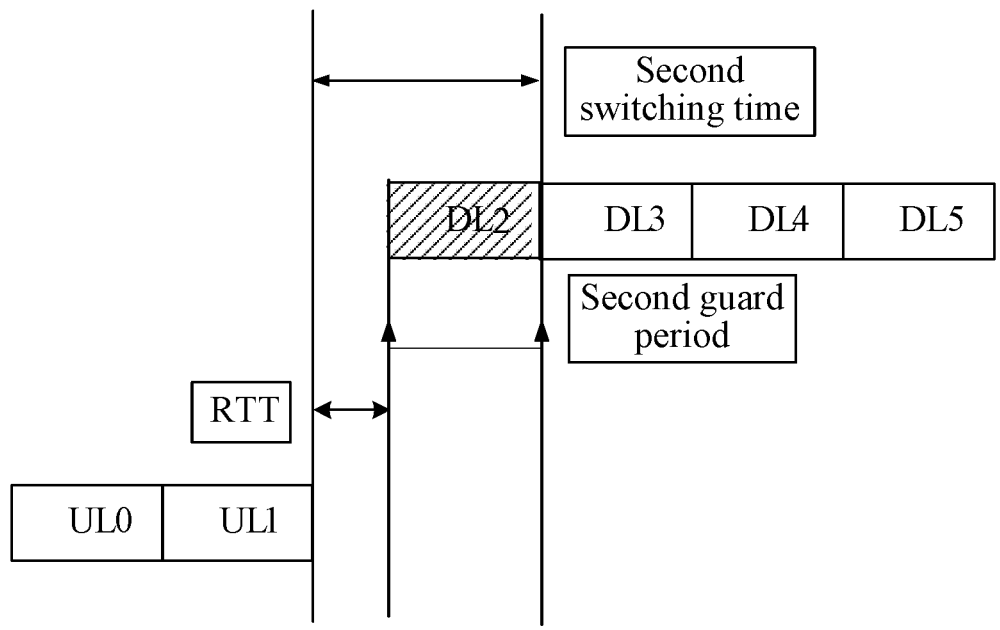
FIG. 19 is a schematic diagram of a scenario during uplink-to-downlink switching of a terminal according to Embodiment 19 of the present invention.

Based on Embodiment 15 described above, Embodiment 19 of the present invention describes a half-duplex frequency division duplex communication method in detail by using an example in which a terminal switches from uplink to downlink and a second guard period overlaps a downlink subframe in a time domain. FIG. 19 is a schematic diagram of a scenario during uplink-to-downlink switching of a terminal according to Embodiment 19 of the present invention.

In this embodiment, when the terminal switches from uplink sending to downlink receiving, if a second switching time is greater than an RTT, and the terminal starts switching after finishing sending an uplink subframe, the second switching time overlaps the downlink subframe. As shown in FIG. 19, the terminal switches from an uplink subframe 1 to a downlink subframe 2, and a time needed for switching is the second switching time. Because the second switching time is greater than an RTT between the terminal and a base station, the second switching time overlaps the downlink subframe 2. Therefore, a second guard period needs to be defined. In this embodiment, the second guard period is equal to 1 millisecond. When the second guard period is equal to 1 millisecond, the second guard period overlaps the downlink subframe 2, and in this case, the terminal does not receive downlink data in the downlink subframe 2, and the base station cannot schedule the terminal in the downlink subframe 2.

In the method provided by this embodiment, when a terminal switches from uplink to downlink, a second guard period overlaps a downlink subframe, and that the terminal does not receive downlink data in the second guard period is defined, and therefore it is avoided that the terminal cannot determine a behavior thereof in the second guard period, so that an uplink subframe of the terminal can be sent successfully, thereby ensuring that a network and the terminal can normally transmit and receive data.

Based on Embodiment 15 described above, Embodiment 20 of the present invention describes a half-duplex frequency division duplex communication method in detail by using an example in which a terminal switches from uplink to downlink and a second guard period overlaps an uplink subframe in a time domain. FIG. 20 is a schematic diagram of a scenario during uplink-to-downlink switching of a terminal according to Embodiment 20 of the present invention.

In this embodiment, when a terminal switches from uplink sending to downlink receiving, if a second switching time is greater than an RTT, and the terminal starts switching at a start position of an uplink subframe and finishes switching at a start position of a downlink subframe, the second switching time overlaps the uplink subframe. As shown in FIG. 20, the terminal switches, at a start position of an uplink subframe 1, to a downlink subframe 2, and a time needed for switching is the second switching time, where the second switching time is greater than an RTT time between the terminal and a base station, and therefore, a second guard period needs to be defined. In this embodiment, the second guard period is equal to 1 millisecond. When the second guard period is equal to 1 millisecond, the terminal does not send uplink data in the uplink subframe 1 in which the second guard period is located, and the base station cannot schedule the uplink subframe 1 for use by the terminal.

In the method provided by this embodiment, when a terminal switches from uplink to downlink, a second guard period overlaps an uplink subframe, and that the terminal does not send uplink data in the second guard period is defined, and therefore it is avoided that the terminal cannot determine a behavior thereof in the second guard period, so that a downlink subframe of the terminal can be received successfully, thereby ensuring that a network and the terminal can normally transmit and receive data.

FIG. 21 is a flowchart of a half-duplex frequency division duplex communication method according to Embodiment 21 of the present invention. This embodiment describes switching of a terminal from uplink sending to downlink receiving. As shown in FIG. 21, the method provided by this embodiment includes the following steps:

Step 601: When data processing of the terminal switches from an uplink subframe to an adjacent downlink subframe, a base station determines a second guard period generated by the terminal.

In a first optional implementation manner, the determining, by the base station, a second guard period generated by the terminal is specifically: determining, by the base station, whether the downlink subframe includes physical hybrid automatic repeat request indicator channel PHICH information sent to the terminal; if the downlink subframe includes the PHICH information sent to the terminal, determining, by the base station, that the second guard period overlaps the uplink subframe; or if the downlink subframe does not include the PHICH information sent to the terminal, determining, by the base station, that the generated second guard period overlaps the downlink subframe.

In a second optional implementation manner, the determining, by the base station, a second guard period generated by the terminal is specifically: determining, by the base station, whether the uplink subframe includes any one of the following uplink signals: a sounding reference signal SRS, a channel quality indicator CQI, and physical uplink control channel PUCCH information; if the uplink subframe includes any one of the uplink signals, determining, by the base station, that the generated second guard period overlaps the downlink subframe; or if the uplink subframe does not include any one of the uplink signals, determining, by the base station, that the generated second guard period overlaps the uplink subframe.

It should be noted that, the two optional implementation manners described above may also be applied to a process in which a terminal switches from a downlink subframe to an adjacent uplink subframe, that is, when the base station determines a first guard period, it may also be determined, according to the two optional implementation manners described above, whether the first guard period overlaps the uplink subframe or the downlink subframe, and a specific process is not described herein again.

Step 602: The base station skips scheduling the terminal in the second guard period or in a subframe in which the second guard period is located, or the base station sets a scheduling priority of the terminal in the second guard period or in a subframe in which the second guard period is located to a lowest level.

In this embodiment, the second guard period may be of the following three values: less than 1 millisecond, equal to 1 millisecond, and greater than 1 millisecond. When the second guard period is less than 1 millisecond, the second guard period overlaps a last part of the uplink subframe, where the last part of the uplink subframe is an overlapping part between the second guard period and the uplink subframe, or the second guard period overlaps a first part of the downlink subframe, where the first part of the downlink subframe is an overlapping part between the second guard period and the downlink subframe. When the second guard period is equal to 1 millisecond, the second guard period overlaps the uplink subframe, or overlaps the downlink subframe. When the second guard period is greater than 1 millisecond, the second guard period overlaps the uplink subframe and an adjacent uplink subframe immediately preceding the uplink subframe, or the second guard period overlaps the downlink subframe and an adjacent downlink subframe immediately following the downlink subframe.

The skipping, by the base station, scheduling the terminal in the second guard period or in a subframe in which the second guard period is located, or setting, by the base station, a scheduling priority of the terminal in the second guard period or in a subframe in which the second guard period is located to a lowest level is specifically: if the second guard period overlaps the uplink subframe, skipping, by the base station, scheduling the terminal in a last part of the uplink subframe or in the uplink subframe, or setting a scheduling priority of the terminal in a last part of the uplink subframe or in the uplink subframe to a lowest level, where the last part of the uplink subframe is an overlapping part between the second guard period and the uplink subframe. If the second guard period overlaps the downlink subframe, the base station skips scheduling the terminal in a first part of the downlink subframe or in the downlink subframe, or sets a scheduling priority of the terminal in a first part of the downlink subframe or in the downlink subframe to a lowest level, where the first part of the downlink subframe is an overlapping part between the second guard period and the downlink subframe.

When the base station skips scheduling the terminal in the first part of the downlink subframe or in the downlink subframe, or sets the scheduling priority of the terminal in the first part of the downlink subframe or in the downlink subframe to the lowest level, the base station determines whether the downlink subframe includes the PHICH information sent to the terminal; and if the downlink subframe includes the PHICH information sent to the terminal, the base station sends, in the Nth downlink subframe after the downlink subframe, the PHICH information to the terminal, where N is a positive integer greater than or equal to 1. The determining, by the base station, whether the downlink subframe includes the PHICH information sent to the terminal is specifically as follows: if the terminal sends PUSCH information in the ith uplink subframe, the base station sends the PHICH information to the terminal in the (i+4)th subframe, to feed back whether the PUSCH information is successfully received; therefore, the base station may determine whether the downlink subframe includes the PHICH information sent to the terminal. Correspondingly, the terminal receives, in the Nth subframe after the downlink subframe, the PHICH information sent to the terminal, so that when data processing of the terminal switches from the uplink subframe to the downlink subframe, loss of the PHICH information can be avoided.

In the method provided by this embodiment, when data processing of a terminal switches from a downlink subframe to an adjacent uplink subframe, a base station determines a second guard period generated by the terminal, and when the second guard period overlaps the first timeslot of the downlink subframe or the last timeslot of the uplink subframe, the terminal cannot send or receive data normally in an overlapping area, that is, the second guard period. In this embodiment, the base station does not schedule the terminal in the first timeslot of the downlink subframe, that is, the second guard period, or a subframe in which the last timeslot of the uplink subframe, that is, the second guard period, is located, thereby avoiding a waste of resources caused by that the base station sends downlink data to the terminal in the second guard period, and improving utilization of resources.

Figure 22:
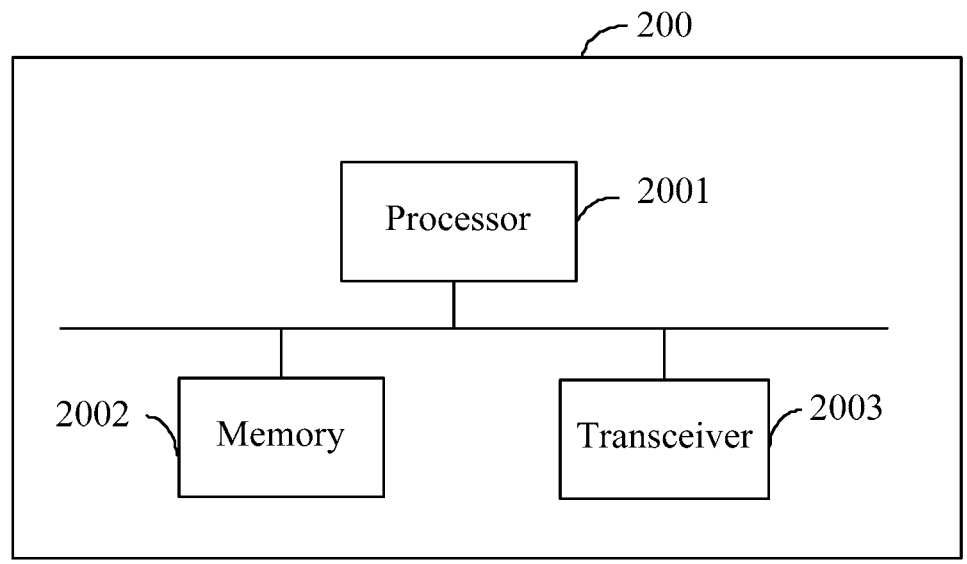
FIG. 22 is a schematic structural diagram of a terminal according to Embodiment 22 of the present invention.

FIG. 22 is a schematic structural diagram of a terminal according to Embodiment 22 of the present invention. As shown in FIG. 22, a terminal 200 provided by this embodiment includes: a processor 2001, a memory 2002, and a transceiver 2003, where the memory 2002 and the transceiver 2003 may be connected to the processor 2001 by using a bus; the memory 2002 stores an instruction, and when the terminal 200 runs, the memory 2002 communicates with the processor 2001, so that the processor 2001 executes the instruction.

The processor 2001 is configured to: when data processing of the terminal switches from a downlink subframe to an adjacent uplink subframe, generate a first guard period, where the first guard period is greater than or equal to 1 millisecond.

The processor 2001 is further configured to control the transceiver 2003 to skip processing any signal in the first guard period.

When the first guard period is greater than 1 millisecond, the first guard period overlaps the downlink subframe and a last part of a first downlink subframe immediately preceding the downlink subframe, and the transceiver 2003 does not receive a downlink signal in the downlink subframe and in the last part of the first downlink subframe.

When the first guard period is greater than 1 millisecond, the first guard period overlaps the downlink subframe and a last part of an uplink subframe immediately preceding the downlink subframe, the transceiver 2003 does not receive a downlink signal in the downlink subframe, and the transceiver 2003 does not send an uplink signal in the last part of the uplink subframe immediately preceding the downlink subframe.

When the first guard period is equal to 1 millisecond, the first guard period overlaps the downlink subframe, and the transceiver 2003 does not receive a downlink signal in the downlink subframe.

In this embodiment, the processor 2001 is specifically configured to generate the first guard period according to a round trip time and a first switching time, where the first switching time includes: a frequency adjustment time and a power adjustment time, the frequency adjustment time is an adjustment time for switching from a downlink frequency to an uplink frequency by an oscillator of the terminal, and the power adjustment time is an adjustment time for adjusting a power from 0 to an uplink transmit power by the terminal.

In this embodiment, the first guard period may be less than or equal to a sum of the round trip time and the first switching time. When the first guard period is equal to the sum of the round trip time and the first switching time, the processor 2001 is specifically configured to add the round trip time and the first switching time, to obtain the first guard period.

In this embodiment, because the first guard period overlaps the downlink subframe, the terminal may not be scheduled by the base station in the downlink subframe.

The terminal provided by this embodiment may be used to execute the technical solution provided by Embodiment 7, and has an implementation manner and a technical effect that are similar to those of Embodiment 7, which are not described herein again.

Figure 23:
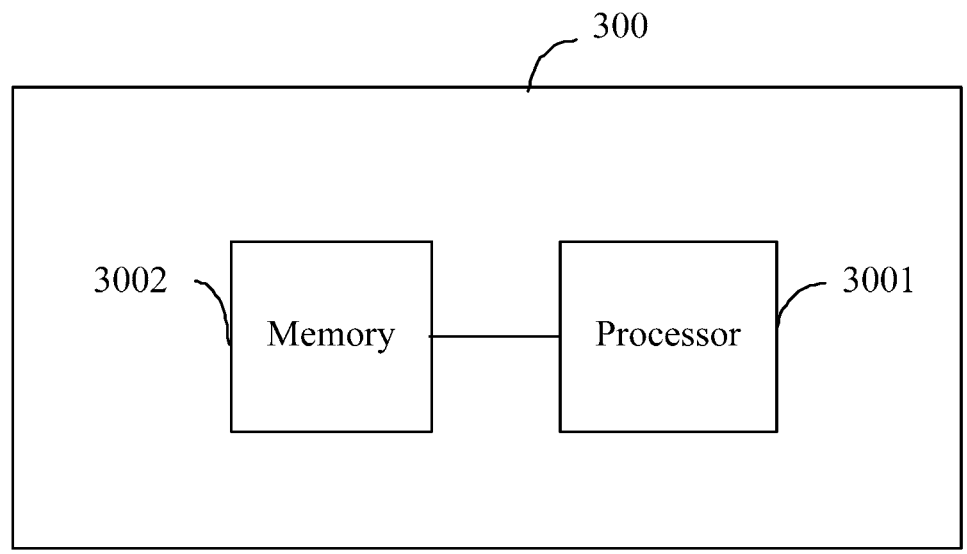
FIG. 23 is a schematic diagram of a base station according to Embodiment 23 of the present invention.

FIG. 23 is a schematic structural diagram of a base station according to Embodiment 23 of the present invention. As shown in FIG. 23, a base station 300 provided by this embodiment includes: a processor 3001 and a memory 3002, where the memory 3002 may be connected to the processor 3001 by using a bus; the memory 3002 stores an instruction, and when the base station 300 runs, the memory 3002 communicates with the processor 3001, so that the processor 3001 executes the instruction. The processor 3001 specifically performs the following operations:

The processor 3001 is configured to: when data processing of a terminal switches from a downlink subframe to an adjacent uplink subframe, determine that a first guard period generated by the terminal overlaps the downlink subframe, where the first guard period is greater than or equal to 1 millisecond.

The memory 3002 is configured to store the first guard period.

The processor 3001 is further configured to: configure the base station to skip scheduling the terminal in the downlink subframe, or set a scheduling priority of the terminal in the downlink subframe to a lowest level.

The processor 3001 is specifically configured to: determine whether the first guard period generated by the terminal is greater than or equal to 1 millisecond; and if yes, determine that the first guard period overlaps the downlink subframe.

In this embodiment, when the first guard period is greater than 1 millisecond, the first guard period overlaps the downlink subframe and a last part of a first downlink subframe immediately preceding the downlink subframe or overlaps the downlink subframe and a last part of an uplink subframe immediately preceding the downlink subframe. When the first guard period is equal to 1 millisecond, the first guard period overlaps the downlink subframe. No matter in which one of the foregoing cases, the first guard period overlaps the downlink subframe, and the terminal cannot send or receive data correctly in the first guard period; therefore, the base station does not need to waste any resource on scheduling the terminal in the downlink subframe.

The base station provided by this embodiment may be used to execute the technical solution provided by Embodiment 10, and has an implementation manner and a technical effect that are similar to those of Embodiment 10, which are not described herein again.

Figure 24:
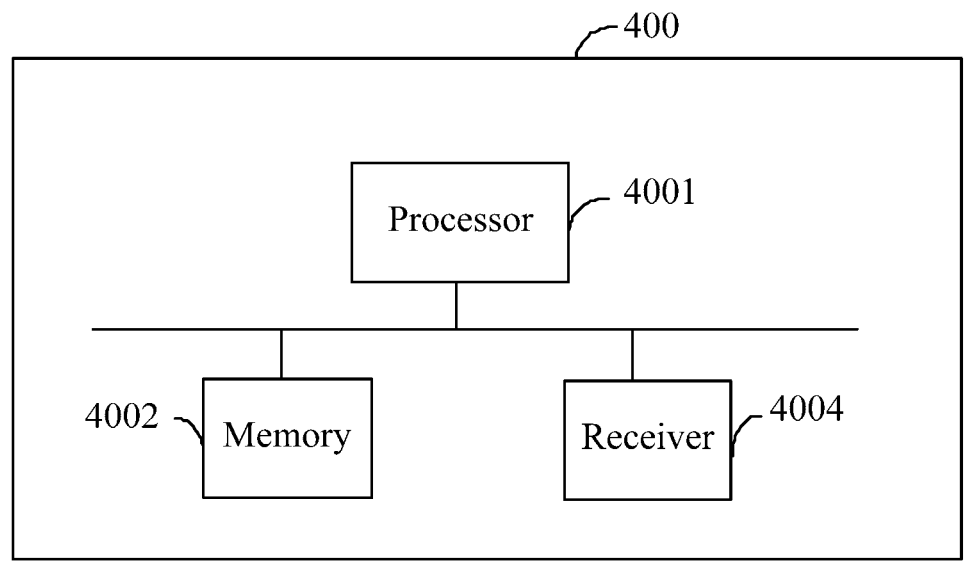
FIG. 24 is a schematic structural diagram of a terminal according to Embodiment 24 of the present invention.

FIG. 24 is a schematic structural diagram of a terminal according to Embodiment 24 of the present invention. As shown in FIG. 24, a terminal 400 provided by this embodiment includes: a processor 4001, a memory 4002, and a receiver 4004, where the memory 4002 and the receiver 4004 may be connected to the processor 4001 by using a bus; the memory 4002 stores an instruction, and when the terminal 400 runs, the memory 4002 communicates with the processor 4001, so that the processor 4001 executes the instruction.

The processor 4001 is configured to: when data processing of the terminal switches from a downlink subframe to an adjacent uplink subframe, generate a first guard period, where the first guard period is less than 1 millisecond, the first guard period overlaps a last part of the downlink subframe, and the terminal is not scheduled by a base station in a last timeslot of the downlink subframe.

The processor 4001 controls the receiver 4004 to skip receiving a downlink signal in the first guard period.

The processor 4001 is specifically configured to: generate the first guard period according to a round trip time and a first switching time, where the first switching time includes: a frequency adjustment time and a power adjustment time, the frequency adjustment time is an adjustment time for switching from a downlink frequency to an uplink frequency by an oscillator of the terminal, and the power adjustment time is an adjustment time for adjusting a power from 0 to an uplink transmit power by the terminal.

The generating, by the processor 4001, the first guard period according to a round trip time and a first switching time is specifically: if the first switching time is included in the round trip time, using, by the processor 4001, the round trip time or the first switching time as the first guard period; or if the first switching time does not overlap the round trip time, adding, by the processor 4001, the round trip time and the first switching time, to obtain the first guard period.

The terminal provided by this embodiment may be used to execute the technical solution provided by Embodiment 11, and has an implementation manner and a technical effect that are similar to those of Embodiment 11, which are not described herein again.

Figure 25:
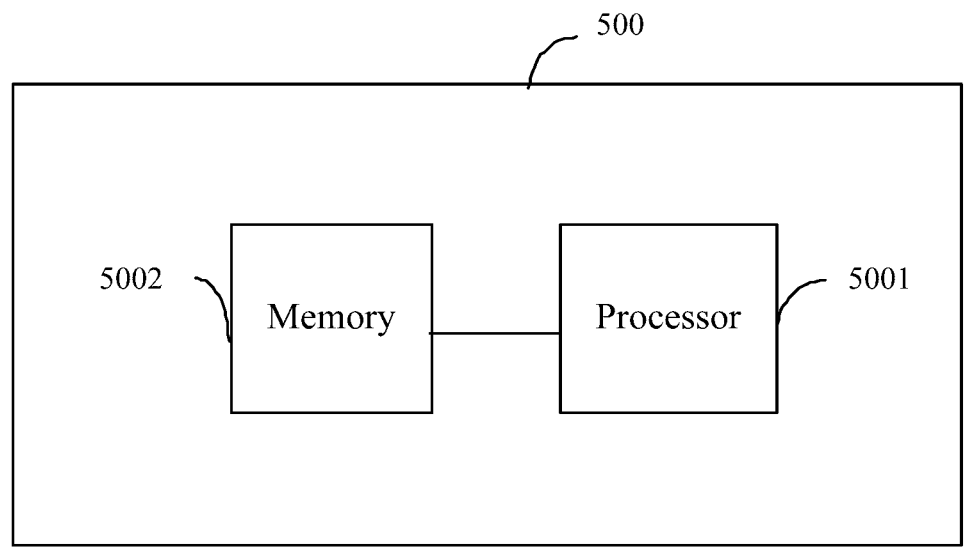
FIG. 25 is a schematic diagram of a base station according to Embodiment 25 of the present invention.

FIG. 25 is a schematic structural diagram of a base station according to Embodiment 25 of the present invention. As shown in FIG. 25, a base station 500 provided by this embodiment includes: a processor 5001 and a memory 5002, where the memory 5002 may be connected to the processor 5001 by using a bus; the memory 5002 stores an instruction, and when the base station 500 runs, the memory 5002 communicates with the processor 5001, so that the processor 5001 executes the instruction. The processor 5001 specifically performs the following operations:

The processor 5001 is configured to: when data processing of a terminal switches from a downlink subframe to an adjacent uplink subframe, determine that a first guard period generated by the terminal overlaps a last timeslot of the downlink subframe, where the first guard period is less than 1 millisecond.

The memory 5002 is configured to store the first guard period.

The processor 5001 is further configured to configure the base station to skip scheduling the terminal in the last timeslot of the downlink subframe, or set a scheduling priority of the terminal in the last timeslot of the downlink subframe to a lowest level.

The processor 5001 is specifically configured to: determine whether the first guard period generated by the terminal is greater than or equal to 0.5 milliseconds and less than 1 millisecond; and if yes, determine that the first guard period overlaps the last timeslot of the downlink subframe.

The base station provided by this embodiment may be used to execute the technical solution provided by Embodiment 14, and has an implementation manner and a technical effect that are similar to those of Embodiment 14, which are not described herein again.

Figure 26:
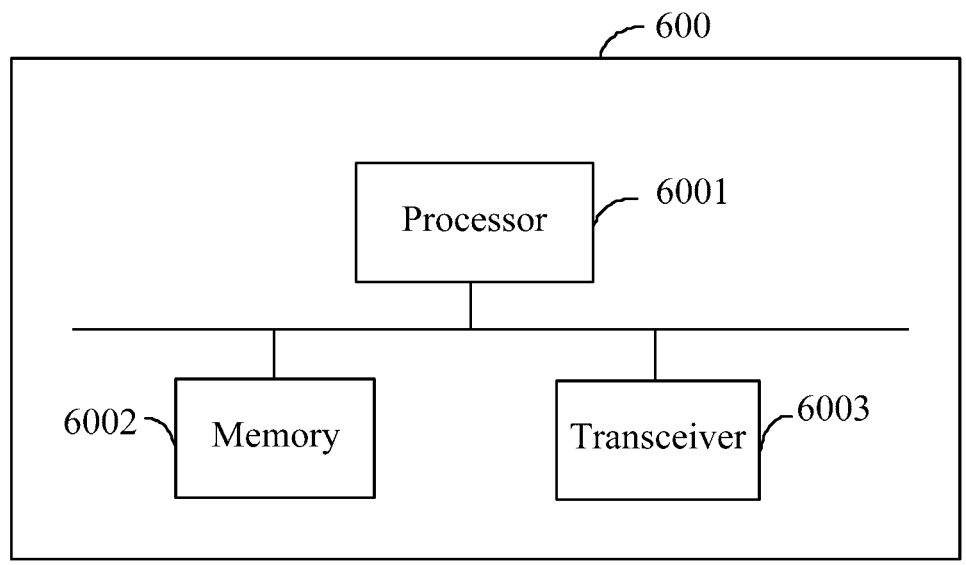
FIG. 26 is a schematic structural diagram of a terminal according to Embodiment 26 of the present invention.

FIG. 26 is a schematic structural diagram of a terminal according to Embodiment 26 of the present invention. As shown in FIG. 26, a terminal 600 provided by this embodiment includes: a processor 6001, a memory 6002, and a transceiver 6003, where the memory 6002 and the transceiver 6003 may be connected to the processor 6001 by using a bus; the memory 6002 stores an instruction, and when the terminal 600 runs, the memory 6002 communicates with the processor 6001, so that the processor 6001 executes the instruction.

The processor 6001 is configured to: when data processing of the terminal switches from an uplink subframe to an adjacent downlink subframe, generate a second guard period.

The processor 6001 is configured to control the transceiver 6003 to skip processing any signal in the second guard period, or skip processing any signal in a subframe in which the second guard period is located.

The processor 6001 is specifically configured to: generate the second guard period according to a round trip time and a second switching time, where the second switching time includes: a frequency adjustment time and a power adjustment time, the frequency adjustment time is an adjustment time for switching from an uplink frequency to a downlink frequency by an oscillator of the terminal, and the power adjustment time is an adjustment time for adjusting a downlink power of the terminal from 0 to a transmit power. If the second switching time is greater than the round trip time, the processor 6001 subtracts the round trip time from the second switching time, to obtain the second guard period.

In a first optional implementation manner, when generating the second guard period, the processor 6001 is specifically configured to: determine whether the downlink subframe includes physical hybrid automatic repeat request indicator channel PHICH information sent to the terminal; if the downlink subframe includes the PHICH information sent to the terminal, generate the second guard period, where the generated second guard period overlaps the uplink subframe; or if the downlink subframe does not include the PHICH information sent to the terminal, generate the second guard period, where the generated second guard period overlaps the downlink subframe.

In a second optional implementation manner, when generating the second guard period, the processor 6001 is specifically configured to: determine whether the uplink subframe includes any one of the following uplink signals: a sounding reference signal SRS, a channel quality indicator CQI, and physical uplink control channel PUCCH information; if the uplink subframe includes any one of the uplink signals, generate the second guard period, where the second guard period overlaps the downlink subframe; or if the uplink subframe does not include any one of the uplink signal, generate the second guard period, where the second guard period overlaps the uplink subframe.

In a first possible implementation manner, the second guard period is less than 1 millisecond, and the second guard period overlaps a first part of the downlink subframe, where the first part of the downlink subframe is an overlapping part between the second guard period and the downlink subframe; when the second guard period overlaps the first part of the downlink subframe, the transceiver 6003 skips receiving a downlink signal in the first part of the downlink subframe, or the transceiver 6003 skips receiving a downlink signal in the downlink subframe. The downlink signal includes one or more of: a physical downlink control channel PDCCH signal, an enhanced physical downlink control channel EPDCCH signal, a cell-specific reference signal, a multimedia broadcast multicast service single frequency network MBSFN signal, a service data signal, a physical hybrid automatic repeat request indicator channel PHICH signal, and a physical control format indicator channel PCFICH signal.

In a second possible implementation manner, the second guard period is less than 1 millisecond, and the second guard period overlaps a last part of the uplink subframe, where the last part of the uplink subframe is an overlapping part between the second guard period and the uplink subframe; when the second guard period overlaps the last part of the uplink subframe, the transceiver 6003 skips sending an uplink signal in the last part of the uplink subframe, or the transceiver 6003 skips sending an uplink signal in the uplink subframe.

In a third possible implementation manner, when the second guard period is equal to 1 millisecond, the second guard period overlaps the downlink subframe, and the transceiver 6003 skips receiving a downlink signal in the downlink subframe.

In a fourth possible implementation manner, when the second guard period is equal to 1 millisecond, the second guard period overlaps the uplink subframe, and the transceiver 6003 skips sending an uplink signal in the uplink subframe.

In this embodiment, the terminal is not scheduled by a base station in the second guard period, or the terminal is not scheduled by a base station in a subframe in which the second guard period is located.

When the second guard period overlaps the first part of the downlink subframe, if the terminal is configured by the base station to receive an enhanced physical downlink control channel EPDCCH signal in the downlink subframe, the skipping, by the transceiver skips 6003, receiving a downlink signal in the first part of the downlink subframe is specifically: skipping receiving the EPDCCH signal or the downlink signal in the first part of the downlink subframe.

When the second guard period overlaps the first part of the downlink subframe, if the terminal is configured by the base station to receive an enhanced physical downlink control channel EPDCCH signal in the downlink subframe, the skipping, by the transceiver 6003, receiving a downlink signal in the first part of the downlink subframe is specifically: determining whether the second guard period overlaps a receiving time of the EPDCCH signal; if the second guard period overlaps the receiving time of the EPDCCH signal, skipping receiving the EPDCCH signal or the downlink signal in the downlink subframe; or if the second guard period does not overlap the receiving time of the EPDCCH signal, skipping receiving the EPDCCH signal or the downlink signal in the first part of the downlink subframe.

When the second guard period overlaps the first part of the downlink subframe, if the terminal is configured by the base station to receive a multimedia broadcast multicast service single frequency network MBSFN signal in the downlink subframe, the skipping, by the transceiver 6003, receiving a downlink signal in the first part of the downlink subframe is specifically: skipping receiving the MBSFN signal or the downlink signal in the first part of the downlink subframe.

When the second guard period overlaps the first part of the downlink subframe, if the terminal is configured by the base station to receive a multimedia broadcast multicast service single frequency network MBSFN signal in the downlink subframe, the skipping, by the transceiver 6003, receiving a downlink signal in the first part of the downlink subframe is specifically: determining whether the second guard period overlaps a receiving time of the MB SFN signal; if the second guard period overlaps the receiving time of the MB SFN signal, skipping receiving the MBSFN signal or the downlink signal in the downlink subframe; or if the second guard period does not overlap the receiving time of the MBSFN signal, skipping receiving the MB SFN signal or the downlink signal in the first part of the downlink subframe.

When the second guard period overlaps the first part of the downlink subframe, if the terminal is configured by the base station to receive a physical downlink shared channel PDSCH signal in the downlink subframe, the skipping, by the transceiver 6003, receiving a downlink signal in the first part of the downlink subframe is specifically: determining whether a physical downlink control channel PDCCH signal corresponding to the PDSCH signal is included in the downlink subframe; if the PDCCH signal is included in the downlink subframe, skipping receiving the PDSCH signal or the downlink signal in the downlink subframe; or if the PDCCH signal is not included in the downlink subframe, skipping receiving the PDSCH signal or the downlink signal in the first part of the downlink subframe.

When the terminal skips receiving a downlink signal in the first part of the downlink subframe, or skips receiving a downlink signal in the downlink subframe, if the downlink subframe includes the PHICH information sent to the terminal, the transceiver 6003 receives, in the Nth downlink subframe after the downlink subframe, the PHICH information sent to the terminal, where N is a positive integer greater than or equal to 1.

The terminal provided by this embodiment may be used to execute the technical solution provided by Embodiment 15, and has an implementation manner and a technical effect that are similar to those of Embodiment 15, which are not described herein again.

Figure 27:
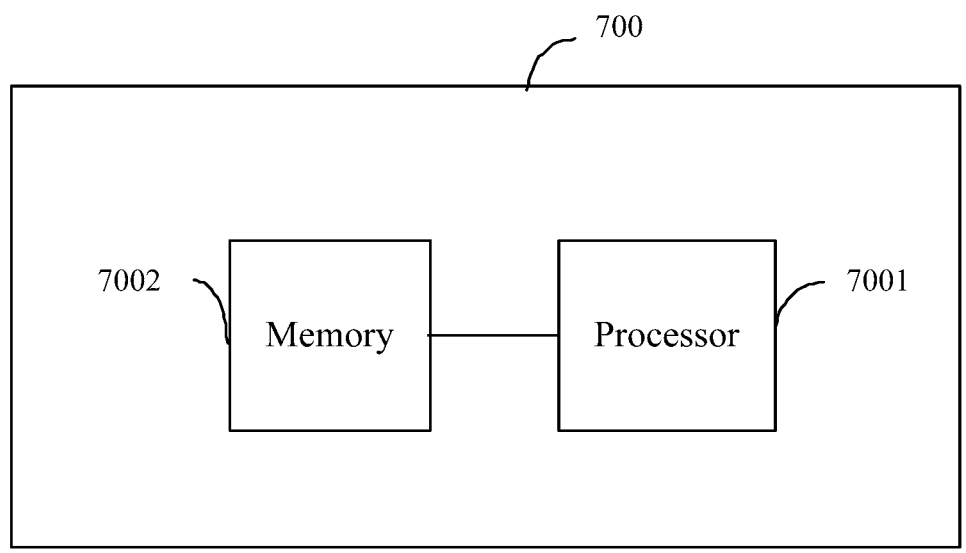
FIG. 27 is a schematic diagram of a base station according to Embodiment 27 of the present invention.

FIG. 27 is a schematic structural diagram of a base station according to Embodiment 27 of the present invention. As shown in FIG. 27, a base station 700 provided by this embodiment includes: a processor 7001 and a memory 7002, where the memory 7002 may be connected to the processor 7001 by using a bus; the memory 7002 stores an instruction, and when the base station 700 runs, the memory 7002 communicates with the processor 7001, so that the processor 7001 executes the instruction. The processor 7001 specifically performs the following operations:

The processor 7001 is configured to: when data processing of a terminal switches from an uplink subframe to an adjacent downlink subframe, determine a second guard period generated by the terminal.

The memory 7002 is configured to store the second guard period.

The processor 7001 is further configured to configure the base station to skip scheduling the terminal in the second guard period or in a subframe in which the second guard period is located, or set a scheduling priority of the terminal in the second guard period or in a subframe in which the second guard period is located to a lowest level.

The determining, by the processor 7001, a second guard period generated by the terminal is specifically: determining whether the downlink subframe includes physical hybrid automatic repeat request indicator channel PHICH information sent to the terminal; if the downlink subframe includes the PHICH information sent to the terminal, determining that the second guard period overlaps the uplink subframe; or if the downlink subframe does not include the PHICH information sent to the terminal, determining that the generated second guard period overlaps the downlink subframe.

In a first optional implementation manner, the configuring, by the processor 7001, the base station to skip scheduling the terminal in the second guard period or in a subframe in which the second guard period is located, or setting a scheduling priority of the terminal in the second guard period or in a subframe in which the second guard period is located to a lowest level is specifically: if the second guard period overlaps the uplink subframe, configuring, by the processor 7001, the base station to skip scheduling the terminal in a last part of the uplink subframe or in the uplink subframe, or setting, by the processor 7001, a scheduling priority of the terminal in a last part of the uplink subframe or in the uplink subframe to a lowest level, where the last part of the uplink subframe is an overlapping part between the second guard period and the uplink subframe; or if the second guard period overlaps the downlink subframe, configuring, by the processor 7001, the base station to skip scheduling the terminal in a first part of the downlink subframe or in the downlink subframe, or setting, by the processor 7001, a scheduling priority of the terminal in the first part of the downlink subframe or in the downlink subframe to a lowest level, where the first part of the downlink subframe is an overlapping part between the second guard period and the downlink subframe.

In a second optional implementation manner, the determining, by the processor 7001, a second guard period generated by the terminal is specifically: determining whether the uplink subframe includes any one of the following uplink signals: a sounding reference signal SRS, a channel quality indicator CQI, and physical uplink control channel PUCCH information; if the uplink subframe includes any one of the uplink signals, determining that the second guard period overlaps the downlink subframe; or if the uplink subframe does not include any one of the uplink signal, determining that the second guard period overlaps the uplink subframe.

The configuring, by the processor 7001, the base station to skip scheduling the terminal in the second guard period or in a subframe in which the second guard period is located, or setting a scheduling priority of the terminal in the second guard period or in a subframe in which the second guard period is located to a lowest level is specifically: if the second guard period overlaps the uplink subframe, configuring, by the processor 7001, the base station to skip scheduling the terminal in a last part of the uplink subframe or in the uplink subframe, or setting, by the processor 7001, a scheduling priority of the terminal in a last part of the uplink subframe or in the uplink subframe to a lowest level, where the last part of the uplink subframe is an overlapping part between the second guard period and the uplink subframe; or if the second guard period overlaps the downlink subframe, configuring, by the processor 7001, the base station to skip scheduling the terminal in a first part of the downlink subframe or in the downlink subframe, or setting, by the processor 7001, a scheduling priority of the terminal in the first part of the downlink subframe or in the downlink subframe to a lowest level, where the first part of the downlink subframe is an overlapping part between the second guard period and the downlink subframe.

When the base station skips scheduling the terminal in the first part of the downlink subframe or in the downlink subframe, or the processor 7001 sets the scheduling priority of the terminal in the first part of the downlink subframe or in the downlink subframe to the lowest level, if the downlink subframe includes the PHICH information sent to the terminal, the base station sends, in the Nth downlink subframe after the downlink subframe, the PHICH information to the terminal, where N is a positive integer greater than or equal to 1.

The base station provided by this embodiment may be used to execute the technical solution provided by Embodiment 19, and has an implementation manner and a technical effect that are similar to those of Embodiment 19, which are not described herein again.

In the several embodiments provided in the present invention, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A terminal, comprising:
a processor, configured to: when data processing of the terminal switches from an uplink subframe to an adjacent downlink subframe, generate a guard period, wherein the guard period is equal to 1 millisecond, the guard period overlaps the downlink subframe; and
the processor, further configured to:
skip receiving a downlink signal in the downlink subframe;
when data processing of the terminal switches from the uplink subframe to the adjacent downlink subframe, determine whether the downlink subframe comprises physical hybrid automatic repeat request indicator channel (PHICH) information sent to the terminal;
when the downlink subframe comprises the PHICH information sent to the terminal, generate the guard period, wherein the guard period overlaps the uplink subframe; and
when the downlink subframe does not comprise the PHICH information sent to the terminal, generate the guard period, wherein the guard period overlaps the downlink subframe.

2. The terminal according to claim 1, wherein the terminal is not scheduled by a base station in the guard period, or the terminal is not scheduled by a base station in a subframe in which the guard period is located.

3. The terminal according to claim 1, wherein the processor is further configured to:
generate the guard period according to a round trip time and a switching time, wherein the switching time comprises: a frequency adjustment time and a power adjustment time, the frequency adjustment time is an adjustment time for switching from an uplink frequency to a downlink frequency by an oscillator of the terminal, and the power adjustment time is an adjustment time for adjusting a downlink power of the terminal from 0 to a transmit power.

4. The terminal according to claim 1, wherein the downlink signal comprises one or more of: a physical downlink control channel PDCCH signal, an enhanced physical downlink control channel EPDCCH signal, a cell-specific reference signal, a multimedia broadcast multicast service single frequency network MBSFN signal, a service data signal, a physical hybrid automatic repeat request indicator channel PHICH signal, or a physical control format indicator channel PCFICH signal.

5. A base station, comprising:
a processor, configured to: when data processing of a terminal switches from an uplink subframe to an adjacent downlink subframe, determine a guard period generated by the terminal, wherein the guard period is equal to 1 millisecond, the guard period overlaps the downlink subframe; and
the processor, further configured to:
configure the base station to skip scheduling the terminal in the guard period or in a subframe in which the guard period is located, or set a scheduling priority of the terminal in the guard period or in a subframe in which the guard period is located to a lowest level;
when data processing of the terminal switches from the uplink subframe to the adjacent downlink subframe, determine whether the downlink subframe comprises physical hybrid automatic repeat request indicator channel (PHICH) information sent to the terminal;
when the downlink subframe comprises the PHICH information sent to the terminal, determine that the guard period overlaps the uplink subframe; and
when the downlink subframe does not comprise the PHICH information sent to the terminal, determine that the guard period overlaps the downlink subframe.

6. A half-duplex frequency division duplex communication method, comprising:
when data processing of a terminal switches from an uplink subframe to an adjacent downlink subframe, generating, by the terminal, a guard period, wherein the guard period is equal to 1 millisecond, the guard period overlaps the downlink subframe;
skipping, by the terminal, receiving a downlink signal in the downlink subframe;
determining, by the terminal, whether the downlink subframe comprises physical hybrid automatic repeat request indicator channel PHICH information sent to the terminal;
when the downlink subframe comprises the PHICH information sent to the terminal, generating, by the terminal, the guard period, wherein the guard period overlaps the uplink subframe; and
when the downlink subframe does not comprise the PHICH information sent to the terminal, generating, by the terminal, the guard period, wherein the guard period overlaps the downlink subframe.

7. The method according to claim 6, wherein the downlink signal comprises one or more of: a physical downlink control channel PDCCH signal, an enhanced physical downlink control channel EPDCCH signal, a cell-specific reference signal, a multimedia broadcast multicast service single frequency network MBSFN signal, a service data signal, a physical hybrid automatic repeat request indicator channel PHICH signal, or a physical control format indicator channel PCFICH signal.

8. The method according to claim 6, wherein the generating, by the terminal, the guard period comprises:
generating, by the terminal, the guard period according to a round trip time and a switching time, wherein the switching time comprises: a frequency adjustment time and a power adjustment time, the frequency adjustment time is an adjustment time for switching from an uplink frequency to a downlink frequency by an oscillator of the terminal, and the power adjustment time is an adjustment time for adjusting a downlink power of the terminal from 0 to a transmit power.

9. The method according to claim 6, wherein the terminal is not scheduled by a base station in the guard period, or the terminal is not scheduled by a base station in a subframe in which the guard period is located.

* * * * *